(12) United States Patent
Papanagiotou

(10) Patent No.: US 11,085,814 B2
(45) Date of Patent: Aug. 10, 2021

(54) INTEGRATED SENSOR SYSTEM

(71) Applicant: KP Enview Ltd., Haverhill (GB)

(72) Inventor: Kyriakos Papanagiotou, London (GB)

(73) Assignee: KP Enview Ltd., Haverhill (GB)

( * ) Notice: Subject to any disclaimer, the term of this patent is extended or adjusted under 35 U.S.C. 154(b) by 300 days.

(21) Appl. No.: 15/735,226

(22) PCT Filed: Jun. 9, 2016

(86) PCT No.: PCT/GB2016/051710
§ 371 (c)(1),
(2) Date: Dec. 11, 2017

(87) PCT Pub. No.: WO2016/198877
PCT Pub. Date: Dec. 15, 2016

(65) Prior Publication Data
US 2018/0180465 A1 Jun. 28, 2018

(30) Foreign Application Priority Data

Jun. 9, 2015 (GB) ...................................... 1510032

(51) Int. Cl.
*G01H 3/12* (2006.01)
*G06F 16/61* (2019.01)
(Continued)

(52) U.S. Cl.
CPC ............. *G01H 3/12* (2013.01); *G01D 11/245* (2013.01); *G06F 11/3013* (2013.01);
(Continued)

(58) Field of Classification Search
CPC ... G01H 3/12; G01H 3/10; G01H 1/00; G06F 16/61; G06F 11/3093; G06F 11/3058;
(Continued)

(56) References Cited

U.S. PATENT DOCUMENTS 4,287,771 A 9/1981 Dugot
4,609,994 A 9/1986 Bassim et al.
(Continued)

FOREIGN PATENT DOCUMENTS

CN 102072144 5/2011
CN 202734954 2/2013
(Continued)

OTHER PUBLICATIONS

International Search Report and the Written Opinion dated Oct. 27, 2016 From the International Searching Authority Re. Application No. PCT/GB 2016/051710. (19 Pages).
(Continued)

*Primary Examiner* — Mohammad K Islam

(57) ABSTRACT

The present invention relates to a method and apparatus for providing noise and/or vibration monitoring. Specifically, the present invention relates to the provision of a distributable and/or configurable method and/or apparatus for noise and/or vibration monitoring.
According to a first aspect, there is provided a method of monitoring ambient sound in an area for use with a device for recording ambient sound, comprising the steps of: receiving ambient sound data from the device; determining when a parameter related to the ambient sound data exceeds a predetermined threshold; and storing ambient sound data when the predetermined threshold is exceeded.

15 Claims, 20 Drawing Sheets

(51) Int. Cl.
*G01D 11/24* (2006.01)
*G06F 11/30* (2006.01)
*G08B 21/18* (2006.01)
*G01P 15/08* (2006.01)

(52) U.S. Cl.
CPC ...... *G06F 11/3058* (2013.01); *G06F 11/3093* (2013.01); *G06F 16/61* (2019.01); *G08B 21/182* (2013.01); *G01P 15/0802* (2013.01)

(58) Field of Classification Search
CPC ... G06F 11/3013; G08B 21/182; G08B 21/02; G01D 11/245; G01P 15/0802; G10K 11/16
See application file for complete search history.

(56) References Cited

U.S. PATENT DOCUMENTS

| | | | |
|---|---|---|---|
| 5,023,847 | A | 6/1991 | Lee |
| 5,717,391 | A * | 2/1998 | Rodriguez ........... G08G 1/0104 340/902 |
| 5,917,775 | A | 6/1999 | Salisbury |
| 5,943,428 | A * | 8/1999 | Seri ................. G01H 3/12 381/56 |
| 6,035,719 | A | 3/2000 | Toyota |
| 8,126,174 | B2 * | 2/2012 | Kornagel ............... H04R 25/00 381/312 |
| 8,892,495 | B2 * | 11/2014 | Hoffberg ............... G06F 7/023 706/48 |
| 9,818,270 | B1 * | 11/2017 | Bendeck ............... H04R 3/00 |
| 2003/0212511 | A1 | 11/2003 | Carle et al. |
| 2006/0095199 | A1 * | 5/2006 | Lagassey ............... B62D 41/00 701/117 |
| 2006/0269104 | A1 * | 11/2006 | Ciolli ................... G08G 1/052 382/104 |
| 2007/0233416 | A1 | 10/2007 | Jeppe |
| 2008/0240450 | A1 | 10/2008 | Bayley et al. |
| 2009/0010443 | A1 | 1/2009 | Ahnert et al. |
| 2010/0079356 | A1 * | 4/2010 | Hoellwarth ............ G06F 3/14 345/8 |
| 2010/0082274 | A1 | 4/2010 | Son et al. |
| 2011/0066411 | A1 | 3/2011 | Morio et al. |
| 2012/0275610 | A1 | 11/2012 | Lambert et al. |
| 2014/0200840 | A1 | 7/2014 | Cox et al. |
| 2015/0341591 | A1 * | 11/2015 | Kelder ................... H04N 9/87 386/285 |
| 2016/0323438 | A1 * | 11/2016 | Jehanno ................ G01H 3/14 |

FOREIGN PATENT DOCUMENTS

| | | |
|---|---|---|
| GB | 1137922 | 12/1968 |
| JP | 05-248932 | 9/1993 |
| JP | 08-145778 | 6/1996 |
| JP | 09-210761 | 8/1997 |
| JP | 2001-165763 | 6/2001 |
| JP | 2003-083803 | 3/2003 |
| JP | 2004-117092 | 4/2004 |
| KR | 10-2007-0101890 | 10/2007 |
| KR | 10-2012-0082304 | 7/2012 |
| WO | WO 2010/030889 | 3/2010 |
| WO | WO 2015/010850 | 1/2015 |
| WO | WO 2016/153640 | 9/2016 |
| WO | WO 2016/198877 | 12/2016 |

OTHER PUBLICATIONS

Wikipedia "Data Buffer", Wikipedia, XP055728819, 3 P., Last Edited Aug. 6, 2020.

* cited by examiner

INTEGRATED SENSOR SYSTEM

RELATED APPLICATIONS

This application is a National Phase of PCT Patent Application No. PCT/GB2016/051710 having International filing date of Jun. 9, 2016, which claims the benefit of priority of United Kingdom Patent Application No. 1510032.4 filed on Jun. 9, 2015. The contents of the above applications are all incorporated by reference as if fully set forth herein in their entirety.

FIELD AND BACKGROUND OF THE INVENTION

The present invention relates to a method and apparatus for providing noise and/or vibration monitoring. Specifically, the present invention relates to the provision of a distributable and/or configurable method and/or apparatus for noise and/or vibration monitoring.

The autonomous monitoring and management of noise is an important element in a number of scenarios due to there being an ever increasing ambient noise footprint in modern societies. The scenarios vary both in nature and complexity and can range from health and safety requirements in the workplace, to extreme cases, such as in heavy industry or mining. In other scenarios it is also important to measure environmental noise caused by construction, demolition, or road traffic, among many other examples, which can cause annoyance to people living or working nearby. Autonomous measurement and assessment of noise is also of great importance for residential areas affected by ambient noise caused by air-traffic, rail-traffic, motorsport noise, quarries, or industrial sites.

Large scale sources of noise, such as large building sites, also tend to be sources of vibration. As such, monitoring and managing vibration levels, alongside noise levels, can be an important concern, particularly when monitoring acceptable vibration levels on and around structures. Monitoring vibration in machine tools is also a crucial component of predictive maintenance.

A wide variety of specialised sensors and systems are available for use in measuring and monitoring noise or vibration. Each system is certified to a level of accuracy (among other factors), allowing users to select equipment based on the level of robustness and accuracy required, and so contains a single sensor certified to that level of accuracy. Such systems typically are not interoperable with each other, with the result that the output from one sensor must be saved by a user, processed on a computer by a user and then combined with the processed output of other sensors by a user in order to produce useful data related to a monitoring project. Typically, this difficulty results from the custom configurations of multiple sensors and processing equipment required for use for large projects, for example where multiple sensors are deployed over a large area, leading to substantial set-up work and increased costs. This is a particular problem where both noise and vibration need to be monitored simultaneously, because of the different sets of sensor equipment required.

In many applications, when monitoring noise/vibration levels to show conformance to legislative requirements or when surveying a large area, for example, it is often desirable to obtain large amounts of data for analysis by taking a large number of measurements across a wide area and over a period of time, or by setting up equipment that may continuously measure the relevant parameters. It may be a challenge to meet this requirement with the use of current monitoring systems due to the poor interoperability of many of the commercially available systems from different manufacturers, together with the typical large size and high cost of these commercially available systems.

SUMMARY OF INVENTION

Aspects and embodiments are set out in the appended claims. These and other aspects and embodiments are also described herein.

According to a first aspect, there is provided a method of monitoring ambient sound in an area for use with a device for recording ambient sound, comprising the steps of: receiving ambient sound data from the device; determining when a parameter related to the ambient sound data exceeds a predetermined threshold; and storing ambient sound data when the predetermined threshold is exceeded.

The above method can allow for the device to monitor (or record) and store audio samples only when the predetermined audio threshold is exceeded, giving a user the ability to clearly identify a noise source from the stored audio sample. Only storing ambient sound above a noise threshold can reduce the storage space required in comparison with storing all of the monitored (or recorded) data and ensures that only important (e.g. noisy) ambient sound is stored.

Optionally, the parameter relates to a measure of ambient noise, further optionally wherein the parameter is sound pressure level.

Optionally, the ambient sound data is continually stored until the end of the earliest of: a first time period from when the parameter exceeds a predetermined threshold; or a second time period from when the parameter falls below the predetermined threshold. Optionally, the first time period is between 20 seconds and 1 minute long, preferably wherein the first time period is 30 seconds long. Optionally, the second time period is between 1 second and 5 seconds long, preferably wherein the first time period is 2 seconds long.

By continually monitoring data but only storing data for certain time periods, the storage space required for the data is reduced, while important sections are not missed.

Optionally, the method comprises the further steps of: recording a sample of ambient sound data into a local data buffer; and overwriting the contents of a local data buffer with the recorded sample. Optionally, the method comprises the further step of storing the contents of the local data buffer when the predetermined threshold is exceeded. Optionally, samples are continuously recorded. Optionally, the method comprises the further step of assembling the stored contents of the local data buffer and the stored ambient sound data into a single audio file. Optionally, the audio file is continuous. Optionally, the length of a sample is between 1 and 30 seconds, preferably wherein the length of a sample is 10 seconds.

Recording samples into a data buffer and storing the same when the threshold is exceeded allows ambient sounds occurring immediately before the threshold being exceeded to be recorded, which may assist in identifying the source of noise.

Optionally, the step of determining when the parameter exceeds a predetermined threshold is performed on the device; and wherein the device is provided with a processor where preferably the processor performs the step of determining whether the parameter exceeds a predetermined threshold. Alternatively, the step of determining when the parameter exceeds a predetermined threshold may be performed at an external server. Optionally, data is stored on an external server. Alternatively, data may be stored on the device; and wherein the device is provided with data storage for storing the data. Optionally, the method comprises the further steps of: receiving a request to transmit one or more items of stored data; and transmitting the one or more items of stored data to an external server in response to the request, wherein the device is in communication with the external server.

Performing processing and/or storing data on the device may improve processing efficiency in some situations, while in other situations it may be preferable to perform processing and/or store data at the external server.

Optionally, the method comprises the further steps of: determining when a further parameter related to the ambient sound exceeds a further predetermined threshold over a predetermined time period; and making the stored data available to a user if the predetermined threshold is exceeded. The further parameter may optionally be the parameter. The further predetermined threshold may optionally be the predetermined threshold. Optionally, the step of making the contents of the local storage available to a user comprises transmitting one or more items of stored data to an external server upon receipt of a request for said one or more items of stored data from the external server, wherein the device is in communication with the external server. Optionally, the step of making the contents of the local storage available to a user comprises transmitting one or more items of stored data to an intermediary user device (for example, the items of stored data could be transmitted to a phone via a Bluetooth connection).

Only making stored data available if a threshold is exceeded for a predetermined time period ensures that only important results (i.e. those results that are relevant to the monitoring of noise) are reported to the user.

Optionally, the stored data is deleted where the further predetermined threshold is not exceeded.

Deleting unused stored data can allow for the efficient use of storage space, and may allow data irrelevant to noise monitoring to be removed.

Optionally, the stored ambient sound data is timestamped.

Timestamping improves the utility of the stored ambient sound data for a user.

Optionally, an alert signal may be transmitted when a threshold is exceeded.

Transmitting an alert may provide additional functionality by letting users know when noise thresholds are exceeded.

A further aspect provides apparatus for recording ambient sound, operable to carry out the described method.

A further aspect provides apparatus for monitoring ambient sound in an area, comprising: means for receiving ambient sound data; means for determining when a parameter related to the ambient sound data exceeds a predetermined threshold; and means for storing ambient sound data when the predetermined threshold is exceeded.

A further aspect provides a computer program product comprising software code for carrying out the described method.

A further aspect provides a method of monitoring ambient noise and vibration in an area for use with at least one sensor node suitable for measuring noise and vibration, comprising the steps of: sending configuration data to the at least one sensor node, wherein the configuration data comprises a specification of one or more desired parameters relating to noise and/or vibration; collecting data relating to noise and/or vibration over a time period using the at least one sensor node; and using the data received from the at least one sensor node to calculate the one or more desired parameters for the time period based on the configuration data for the at least one sensor node. Optionally, a plurality of sensor nodes are used; and the one or more desired parameters for the time period are calculated based on the configuration data for each sensor node. Optionally, the one or more desired parameters are calculated at the at least one sensor node. Optionally, the step of collecting data is based on the configuration data for the at least one sensor nodes.

Allowing for central configuration of only desired parameters improves processing efficiency and can simplify the management and deployment of one or more devices for users.

Optionally, the method comprises the further step of: assembling results data comprising the one or more desired parameters; and wherein the results data further comprises one or more of: time data, location data, and recorded ambient sound.

Providing additional information in the results data improves the utility of the data.

Optionally, the method comprises the further step of transmitting results data to an external server, wherein the sensor node is in communication with the external server. Optionally, the method comprises the further step of compiling results data thereby to assemble data relating to noise and/or vibration in the area.

Compiling results data and the use of an external server can allow data to be usefully and conveniently presented to a user.

Optionally, the method comprises the further step of transmitting an alert signal from the at least one sensor node in relation to one or more of: a user-set threshold in relation to noise and/or vibration being exceeded, a battery of the sensor node running low on power, an external power source being connected or disconnected, a measurement error being detected, or the sensor node being moved.

The use of alerts allows a user to remedy any problems with one or more of the sensor nodes and allow the system to act as an (emergency) warning system.

Optionally, the configuration data further comprises at least one of: operating times of the at least one sensor node, and the alerts transmitted by the at least one sensor node.

Providing further information with the configuration data may improve the ease of use of the system.

Optionally, the method comprises the further steps of: calculating one or more desired parameters over a further time period, wherein the further time period is shorter relative to the time period, preferably wherein the further time period is approximately 10 seconds long.

Using a further (shorter) time period may allow for near-real time results to be calculated and reported to users in respect of some parameters, which may be provided in combination with the more complete set of parameters calculated over a longer time period.

Optionally, the sensor nodes are operable to interface with a user device thereby to allow the export of result data and/or the import of configuration data. Optionally, the method comprises the further step of synchronising configuration data between the sensor nodes and an external server. Optionally, the time period is user-set.

A further aspect provides a system for measuring noise and vibration comprising at least one sensor node suitable for measuring noise and vibration, wherein the system is adapted for carrying out the described method.

A further aspect provides a system for monitoring ambient noise and vibration in an area, comprising: at least one sensor node comprising means for collecting data relating to noise and/or vibration over a time period; means for sending configuration data to the at least one sensor node, wherein the configuration data comprises a specification of one or more desired parameters relating to noise and/or vibration; and means for calculating the one or more desired parameters for the time period using the data received from the at least one sensor node based on the configuration data for the at least one sensor node.

A further aspect provides a computer program product comprising software code for carrying out the described method.

A further aspect provides a method of configuring a device suitable for monitoring noise and vibration based on locally stored configuration data, comprising the steps of: searching for new configuration data available to the device via a communication network; and overwriting the locally stored configuration data with new configuration data such if new configuration data is found, such that the device monitors noise and/or vibration in accordance with any new configuration data. Optionally, configuration data comprises a specification of one or more parameters relating to noise and/or vibration which are calculable by the device thereby to monitor noise and/or vibration. Optionally, the configuration data comprises data related to a firmware update and/or a software update.

This allows devices to be configured quickly and easily, minimising any disruption to monitoring.

Optionally, the method provides the further step of turning the device on when the device is supplied with power.

This allows the disruption to monitoring caused by power failures to be minimised.

A further aspect provides apparatus for monitoring noise and vibration, operable to carry out the described method.

A further aspect provides a computer program product comprising software code for carrying out the described method.

A further aspect provides a device suitable for monitoring noise and vibration based on locally stored configuration data, comprising: data storage for storing configuration data; means for searching for new configuration data available to the device via a communication network; and means for overwriting the locally stored configuration data with new configuration data if such new configuration data is found, such that the device monitors noise and/or vibration in accordance with any new configuration data.

A further aspect provides a device suitable for monitoring noise and vibration, comprising one or more processors; one or more data inputs operable to receive input signals from a microphone and/or an accelerometer; a data output; and an internal accelerometer operable to detect when the device is moved; wherein the processor is used to calculate one or more parameters relating to noise and/or vibration using the input signals; and wherein at least one of the one or more parameters is output by the processor via the data output. Optionally, the device is configured to output an alert via the data output when the device detects that it is moved.

Providing a monitoring device with an internal accelerometer allows movements of the device to be detected, and issuing alerts may allow the user to take remedial action to reduce disruption to monitoring.

According to another aspect, there is provided a device suitable for monitoring noise and vibration, comprising one or more processors; one or more data inputs operable to receive input signals from a microphone and/or an accelerometer; and a data output; wherein the processor is used to calculate one or more parameters relating to noise and/or vibration using the input signals; and wherein at least one of the one or more parameters is output by the processor via the data output.

By providing a single device with the ability to receive input signals from either or both an audio sensor and a vibration sensor, the parameters relating to noise and vibration for the locations of the audio and/or vibration sensors can be calculated on a single device, for example in batches or concurrently, before being output.

Optionally, the one or more parameters are assembled into a results file.

By assembling a results file containing data relating to one or more parameters, the parameters can be processed or stored more efficiently.

Optionally, the device further comprises location-detecting means. Optionally, the location-detecting means comprises a satellite positioning receiver. Optionally, the results file further comprises location data. Storing location data, for example location data captured using a GPS (or GLOSNASS or GALILEO or a combination of either of these or either of these with GPS or all three systems) satellite positioning receiver, for example in a single results file or multiple results files, can enable an assessment of noise and/or vibration over an area as the location or locations at which noise and/or vibration are detected can be pinpointed on a map and common sources of noise and/or vibration identified and plotted to the extent possible from the data available.

Optionally, the results file further comprises time data.

Where data over time is available, an assessment of changes in noise and/or vibration over time can be made by a user in possession of results files also containing time data.

Optionally, the one or more parameters are user-set. Optionally, the one or more parameters are calculated over a set time period. Optionally, the time period is user-defined.

By allowing the user to determine the parameters collected and/or the time period of interest, the results can be captured according to the user's needs.

Optionally, the data output is coupled to at least one of a WLAN access point, a GSM connection, an Ethernet connection, a USB connection, or a memory card. Optionally, the GSM connection uses a GPRS, 3G, or 4G telecommunication network.

All of the alternative data outputs that are possible for implementation on the device allows for flexibility in how to communicate and/or store the output data.

Optionally, the device further comprises a casing. Optionally, the device further comprises a battery. Optionally, the device further comprises a power input configured to allow an external power source to power the device and/or charge the battery.

Providing protection for the electronics and a power source allows that the device is well-suited for use, for example outdoors, as a passive monitor.

Optionally, the total dynamic range of the device for audio-related input signals is approximately 16 dB(A) RMS-140 dB(A) Peak. Optionally, the linear dynamic range of the device for audio-related input signals is approximately 26 dB(A) RMS-140 dB(A) Peak. Optionally, the performance of the device for audio-related input signals conforms to the electroacoustical performance specifications of IEC 61672-1 for a class 1 sound level meter.

A device having the above parameters and/or conforming to the specifications of IEC 61672-1 (incorporated herein by reference) for a class 1 sound level meter can be used to measure and/or monitor a wide range of audio sources to a high degree of accuracy.

Optionally, total dynamic range of the device for vibration-related input signals is approximately 0.0005 m/s² RMS to 50 m/s² PEAK. Optionally, the input frequency range of the device for vibration-related input signals is approximately 1 Hz-10 kHz. Optionally, the performance of the device for vibration-related input signals conforms to the specifications of ISO 10816-1.

A device having the above parameters and/or conforming to the specifications of ISO 10816-1 (incorporated herein by reference) can be used to measure and/or monitor a wide range of vibration sources to a high degree of accuracy.

Optionally, the one or more desired parameters comprise any one of: sound pressure level, equivalent continuous noise level, highest measured sound value, lowest value measured over a time period, equivalent continuous noise level, sound exposure level, peak sound measurement, day-evening-night equivalent sound level, statistical noise levels, RMS vibration, MAX vibration, PEAK vibration, peak particle velocity, or vibration dose value.

The device can calculate a wide variety of useful parameters, and so is useful for a wide variety of usage by a user.

Optionally, the data output is used to alert one or more users of the sensor node if a noise and/or vibration level exceeds a user-set threshold.

By alerting a user upon a noise and/or vibration exceeding a threshold, the device may additionally function as a (emergency) warning system.

Optionally, the data output is used to alert one or more users of the sensor node in dependence on a condition of the sensor node. Optionally, the condition of the sensor node is a detected change in location. Optionally, the condition of the sensor node is battery voltage.

Triggers for alerts based on data output, or accelerometers, or location change detection, or battery voltage detection, or on connection or disconnection of sensors can alert the user when the functioning of the device is likely to be affected by a problem or a change in condition of the device.

Optionally, the device further comprises a connection for an external signalisator.

The signalisator provides an additional means of alerting users.

A further aspect provides a device as described adapted for use as a device for recording ambient sound according to a method as previously described.

A further aspect provides a device as described adapted for use as a sensor node according to a method as previously described.

A further aspect provides a device as described adapted for use as a device according to a method as previously described.

A further aspect provides a device as described adapted to execute the computer program product as previously described.

A further aspect related to a system for monitoring noise and vibration, comprising one or more accelerometers; one or more microphones; a plurality of sensor nodes forming a network; and a server; wherein the plurality of sensor nodes are devices as previously described.

This allows noise and/or vibration may be monitored between multiple sensor nodes with each node having a device according to an embodiment. An autonomous noise and vibration monitoring system is thereby provided.

Optionally, the data output is used to transmit the one or more parameters to the server.

By using a server, results received from the network of sensor nodes can be stored together and further processed, for example to compile the data into a database or data store.

Optionally, the one or more microphones conform to the electroacoustical performance specifications of IEC 61672-1 for a class 1 sound level meter. Optionally, the one or more microphones have a sensitivity of 50 mV/Pa and a Bias Voltage between 8-30V (DC).

By using class 1 microphones, for example those with a sensitivity of 50 mV/Pa and a Bias Voltage between 8-30V (DC), high quality audio measurement is possible.

Optionally, the one or more accelerometers are tri-axial. Optionally, the one or more accelerometers have a sensitivity of 1000 mV/g.

The use of either tri-axial accelerometers or accelerometers having a sensitivity of 1000 mV/g allows for high quality vibration measurement.

A further aspect provides a method of monitoring noise and vibration in an area, comprising: providing a plurality of sensor nodes forming a network; collecting data relating to noise and/or vibration over a set time period using the plurality of sensor nodes; calculating one or more desired parameters relating to noise and/or vibration for the time period using the plurality of sensor nodes; creating a results file; and compiling results files using a server. Optionally, the plurality of sensor nodes are devices as previously described.

Optionally, the method further comprises reporting compiled results files to a user accessing the server. Optionally, the method further comprises configuring the plurality of sensor nodes using the server. Optionally, the user may access the server using a web portal. Optionally, the user may access the server using a mobile application.

Providing a user with a server that allows access to the results and the configuration process for the devices and/or the system, the user can conveniently monitor noise and vibration over an area and configure the network of sensor nodes.

The invention also provides a computer program and a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

The invention extends to methods and/or apparatus substantially as herein described and/or as illustrated with reference to the accompanying drawings.

The invention extends to any novel aspects or features described and/or illustrated herein.

Any feature in one aspect of the invention may be applied to other aspects of the invention, in any appropriate combination. In particular, method aspects may be applied apparatus aspects, and vice versa. As used herein, means plus function features may be expressed alternatively in terms of their corresponding structure, such as a suitably programmed processor and associated memory.

Furthermore, features implemented in hardware may generally be implemented in software, and vice versa. Any reference to software and hardware features herein should be construed accordingly.

Any feature in one aspect may be applied to other aspects, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

BRIEF DESCRIPTION OF THE SEVERAL VIEWS OF THE DRAWINGS

Embodiments will now be described, by way of example only and with reference to the accompanying drawings having like-reference numerals, in which.

. DESCRIPTION OF SPECIFIC EMBODIMENTS OF THE INVENTION

Figure 1:
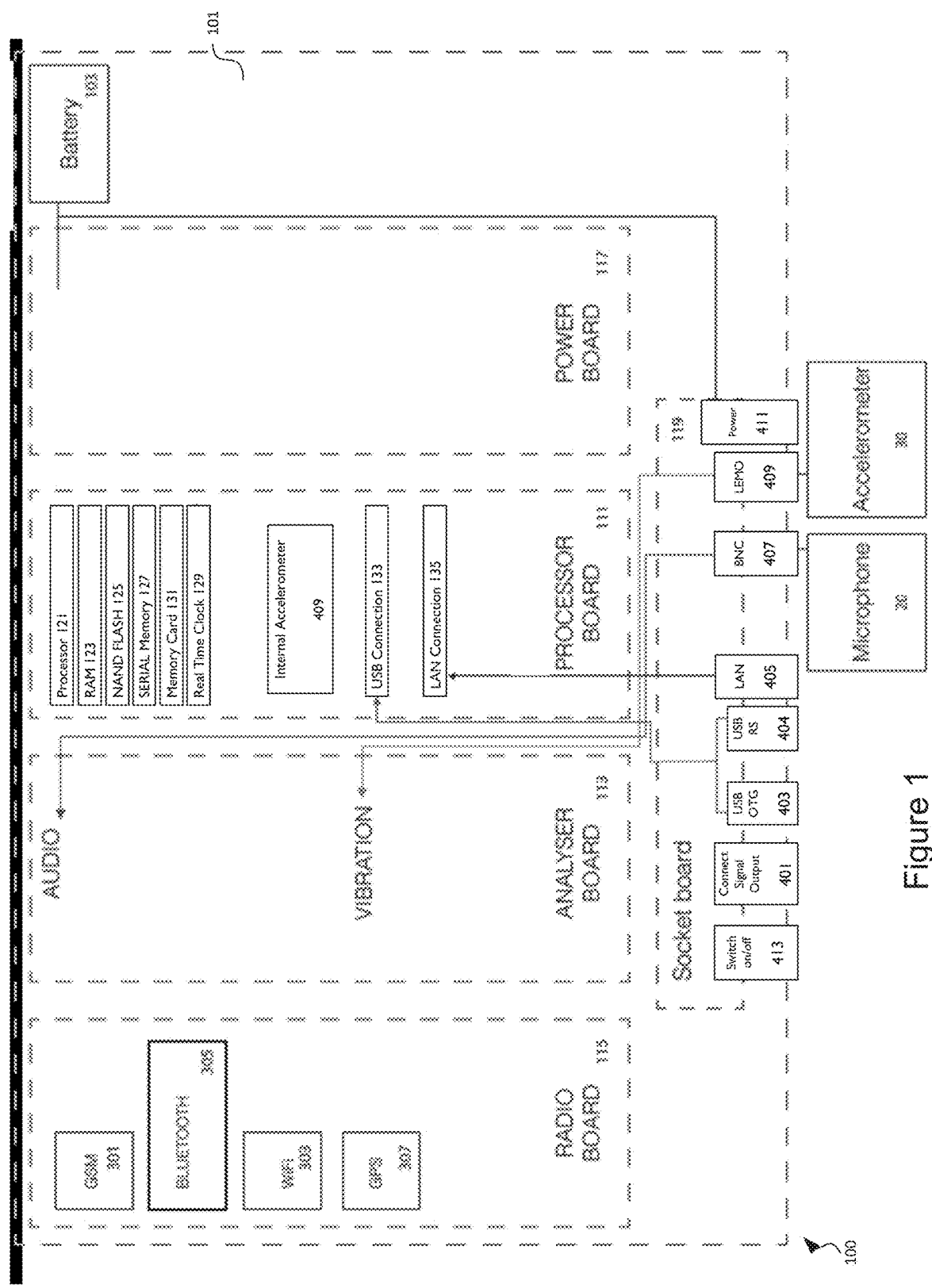
FIG. 1 shows a schematic diagram of the physical components of a device according to an embodiment.

Referring now to FIG. 1, there is shown a schematic diagram of the internal physical components of a device 100 according to an embodiment, which will now be described.

The device 100 comprises a casing 101, a battery 103, and a number of printed circuit boards (PCBs), each PCB having a distinctive function. In the embodiment shown in FIG. 1, 5 PCBs are provided, referred to as a radio board 115 for holding communication modules, an analyser board 113 for holding componentry for analysing captured data, a processor board 111, a power board 117 and a socket board 119 arranged to hold components allowing a physical connection to be made with the device. An advantage of providing multiple PCBs which perform discrete functions is that an entire PCB (with associated componentry) can easily be replaced if necessary, as opposed to the difficulties associated with replacing individual components towards the end of their lives.

The device 100 provided is configured to measure and process desired parameters related to noise and vibration. It will be appreciated that the two types of sensor to be used with the device 100 are a microphone 20, to measure noise, and an accelerometer 30, to measure vibration. Advantageously, the device 100 may therefore be used to monitor both noise and vibration, although only one sensor of each type may be used if an application demands that only noise or vibration needs to be monitored. The device 100 may monitor both noise and vibration at the same type. Alternatively, only one or noise or vibration may be measured even if a microphone 20 and accelerometer 30 are both connected to the device 100.

These sensors are provided external to the device 100 and are preferably connected to the device 100 via a TNC connector 407 for the microphone 20 and a LEMO connector 409 for the accelerometer 30. These connectors are preferably located directly on the socket board 119, as will be described later. The device is configured to use any class 1 microphone 20 with a sensitivity of 50 mV/Pa and a Bias Voltage between 8-30V, (DC), and any type of triaxial accelerometer 30 with a sensitivity of 1000 mV/g. Preferably, a Bias Voltage of 24V (DC) is used. Both sensors are preferably TEDS-compliant. In the case where a TEDS sensor is used, the device 100 may be able to recognise the sensor and read the sensor's specific parameters, including calibration factors, from the sensor's memory. When required, the device 100 may also be able to save information about sensor parameters onto this memory.

It will be appreciated that sensors with different specifications may also be used with the device 100; however, the analyser board 113 may need to be replaced with an alternative board to meet the sensors' specification. The device 100 is arranged to be modular, such that easy replacement of the analyser board 113 and other components is possible.

The device 100 is designed to be used outdoors, so the casing 101 of the device 100 should preferably be resistant to water and dust ingress so as to achieve at least IP54 rating. The casing 101 is preferably made of aluminium with a composite top cover attached permanently to the aluminium enclosure. The socket board 119 is preferably provided towards the bottom of the device 100, where the casing 101 provides holes to allow all sockets to be accessed from the exterior of the device 100, as is shown schematically in FIG. 1. The casing 101 is preferably arranged to provide access to the device's internal componentry through the bottom of the device 100 via a removable section (not shown).

The battery 103 is internally-housed and preferably is a rechargeable lithium-polymer battery. The battery 103 may be housed around the power board 117. A fully charged battery 103 is preferably able to power the device 100 for at least 10-12 hours of continuous operation, and more preferably for at least 24 hours of continuous operation. The device 100 may be operable for use in a low power mode, where certain functions are shut down in order to improve the battery life of the device 100. To ensure continuous operation over a longer period, the device 100 may be connected to any external power source providing DC voltage between 12-50V (DC) via a power socket 411. Those sources can include an external power supply, an external battery pack, solar panels or a wind turbine. This external power input may be used to charge the battery 103 and/or directly power the device 100. Where no external power supply is available or where the power supply is interrupted, the device 100 may switch to being powered by the internal battery 103 to provide uninterrupted measurements.

The processor board 111, the analyser board 113, power board 117, radio board 115 and socket board 119 can be physically arranged one on top of the other, separated by a distance of approximately 1 cm.

As shown in FIG. 1, the processor board 111 comprises one or more processors 121, operational RAM memory 123, NAND FLASH memory 125 for local storage (which may be provided as a removable Micro USB card or be attached directly to the processor board 11), SERIAL memory 127 for system and configuration files, and various other connection and transmission-related components. In some embodiments, three processors 121 are used. In some embodiments, 512 MB of operational RAM memory 123 and 64 MB of SERIAL memory 127 are provided.

The processor 121 used may be an AT32UC3 Audio series processor, for example. Its functions will be described later on with reference to how measurements are taken and analysed. The processor board 111 may further comprise a real time clock 129 powered by a battery, such as a CR3022 battery, to properly mark each sample for analysis with a timestamp. In some embodiments, the real time clock 129 has an accuracy of at least 2 ppm.

The processor board 111 in some embodiments can also comprise a memory card 131, such as an SD card, which can be used to store data which is later exported. The processor board 111 may optionally further comprise one or more USB connections 133, which may be used to allow the device to interface with a computer, for example, via USB sockets 403, 404 located on the socket board 119. The processor board 111 may optionally also comprise means 135 for communicating over LAN networks and the Ethernet physical layer via an Ethernet connection port 405 located on the socket board 119.

The processor board 111 may also comprise an additional accelerometer 409, configured to collect data related to movement of the device 100. This accelerometer 409, however, may not be suitable for use in vibration monitoring.

The socket board 119 comprises all external connections to the device. The socket board 119 comprises TNC connector 407 and LEMO connector 409, as mentioned earlier. The socket board 119 may also optionally comprise one or more USB OTG sockets 403 for file transfers, a USB RS socket 404 for device configuration and calibration, an ETHERNET socket 405 for LAN connections and a signal output connector 401 for the optional provision of an external signalisator. Alternatively, a multiport 415 may be provided on the socket board 119, where this multiport 415 is arranged to accept a microphone 20 and/or accelerometer 30 cable and/or act as a power input. In some embodiments, an on/off switch 413 is also provided next to the aforementioned sockets on the exterior of the device 100, where this switch 413 is configured to communicate with the processor and power boards 111, 117 to start or shut down the device 100 when switched.

The radio board 115 may comprise means 301 for communication using a GSM cellular network and a subscriber identification module (SIM). The means 301 for communication preferably uses GPRS/HSDPA/3G/4G networks. The radio board 115 may also comprise means for communicating over wireless local area networks (WLAN) (such as a WLAN client 303) and means for communicating over Bluetooth 4.0 networks (such as a Bluetooth 4.0 controller 305). The Bluetooth network may be used to communicate with Bluetooth-enabled user devices, such as computers and mobile devices, and, optionally, may be used to transfer current readings and/or download stored data, and/or read information related to the status of the device 100.

The radio board 115 may also comprise a GPS receiver and associated componentry (or 'GPS chip' 307), which allows gathered results to be associated with the location at which they were gathered.

Figure 2A:
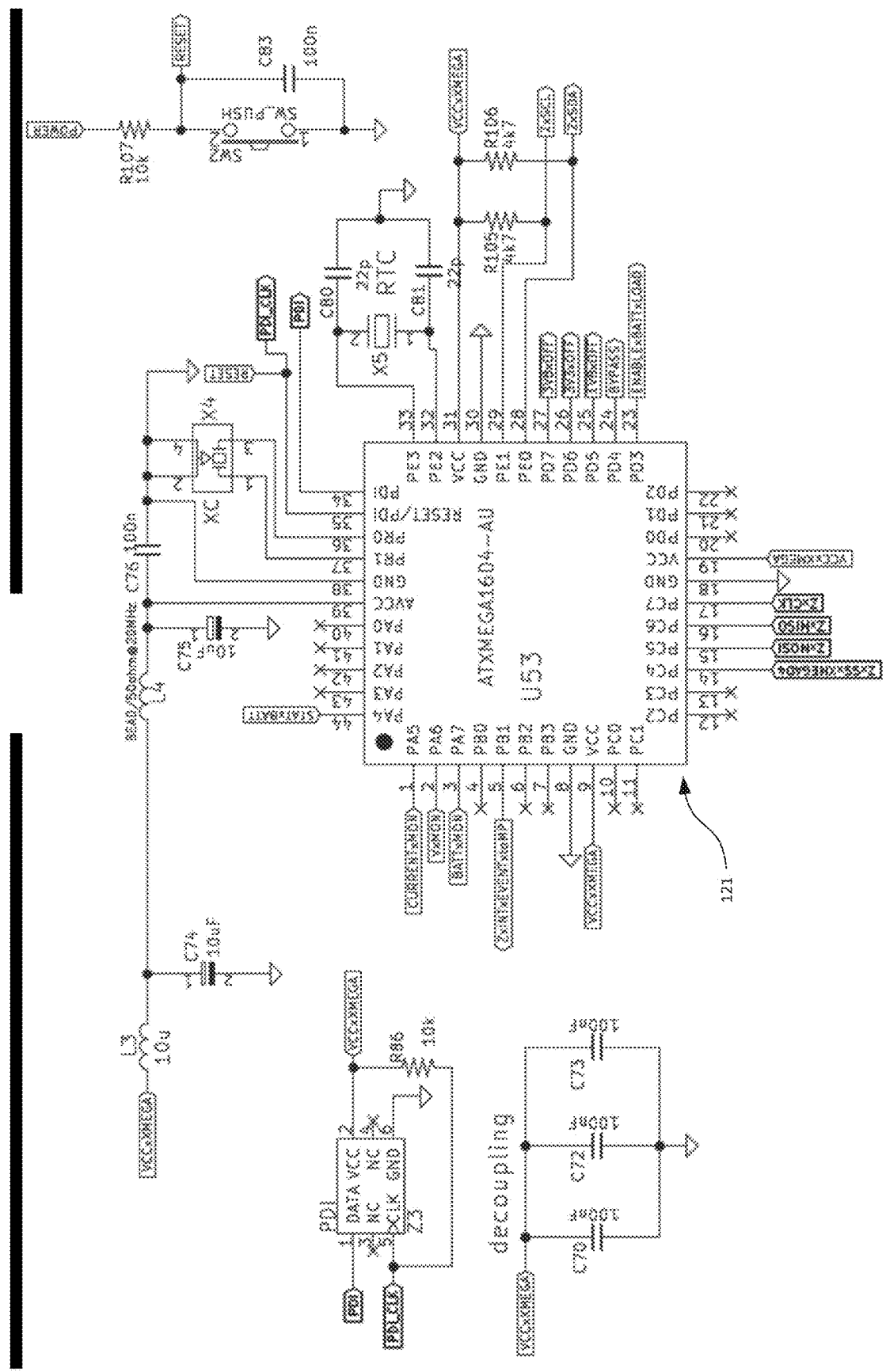
FIGS. 2a, 2b, 2c, 2d and 2e show circuit diagrams illustrating various possible configurations for components of a power circuit of an embodiment of the device.
Figure 2B:
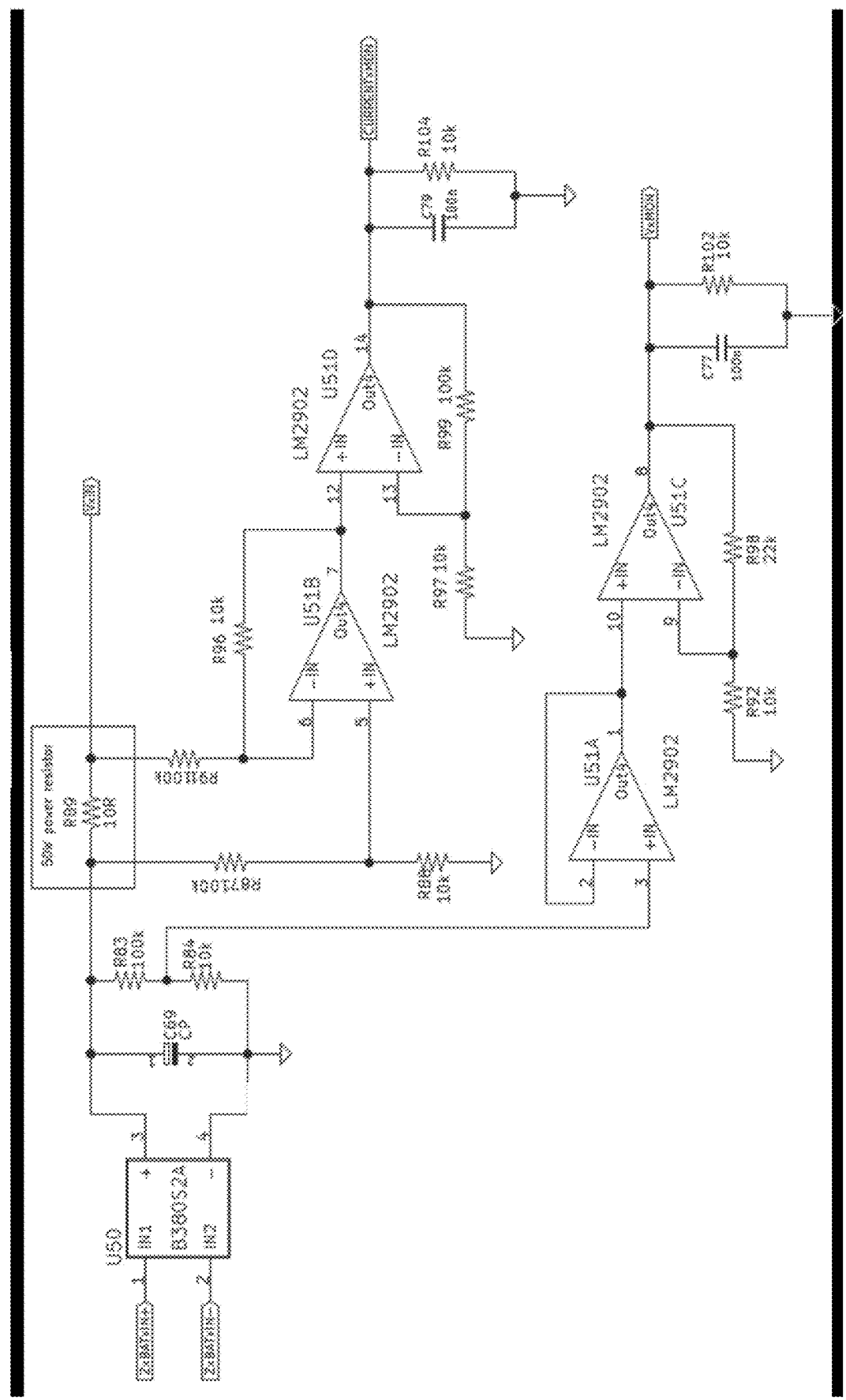
Figure 2C:
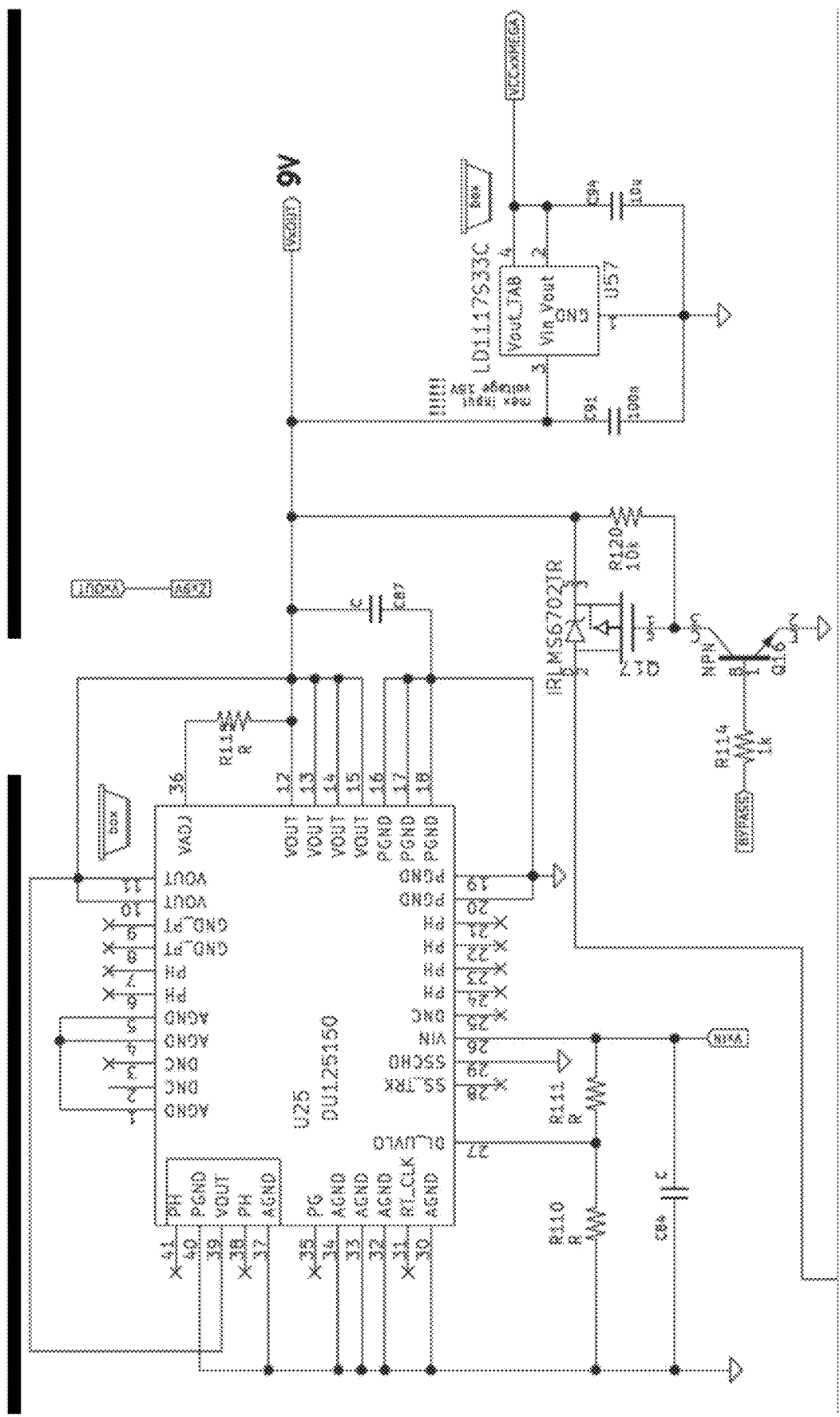
Figure 2D:
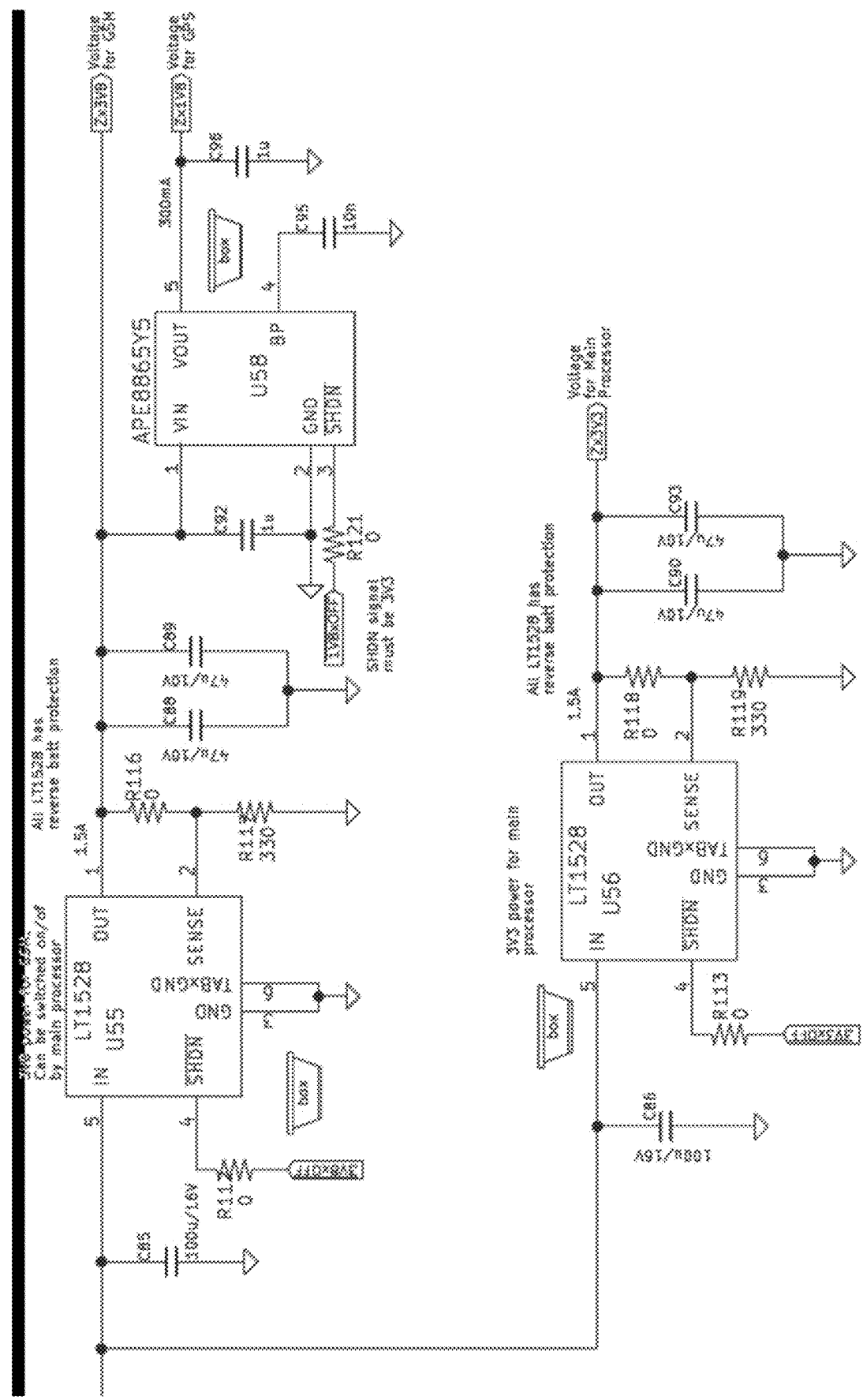
Figure 2E:
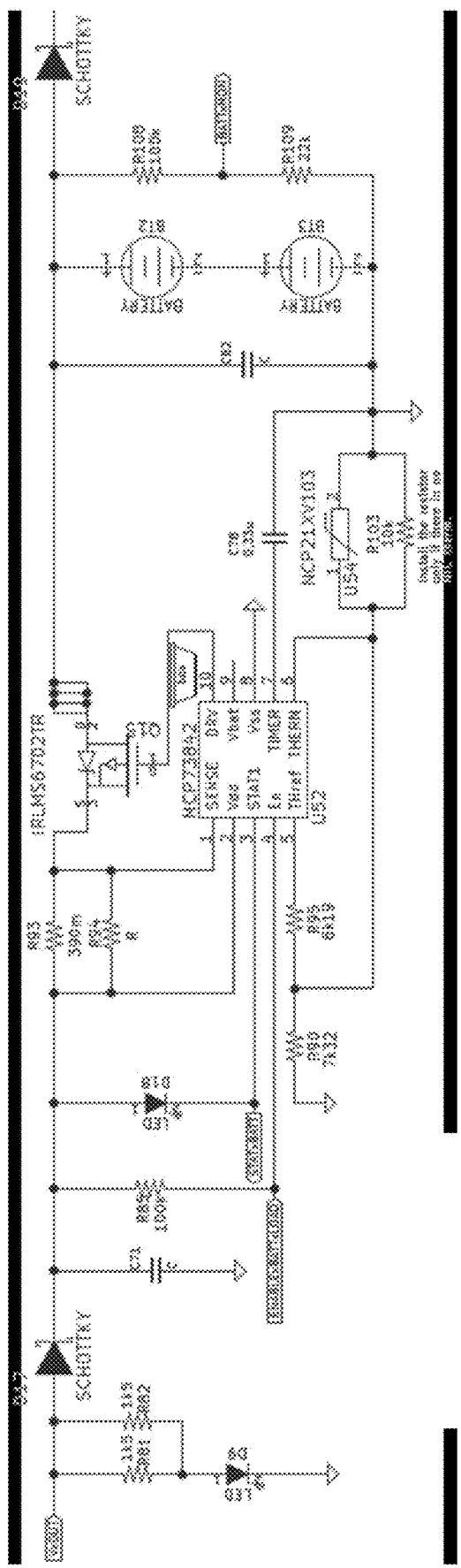

FIGS. 2a to 2e show circuit diagrams illustrating various possible configurations for components of the power board 117. The power board 117 is arranged to transmit electrical power from the battery 103 to the electronic components of the device 100 and as such may comprise means for controlling power supplied to the processor 121 (FIG. 2a), means for receiving an input from the battery and switching the connection to the battery on and off (FIG. 2b), means for regulating power from the battery (FIG. 2c), means for regulating the voltage supplied to various other components of the main board 111 (FIG. 2d), and means for charging the battery using an external power source via the power input 411 (FIG. 2e).

Figure 3:
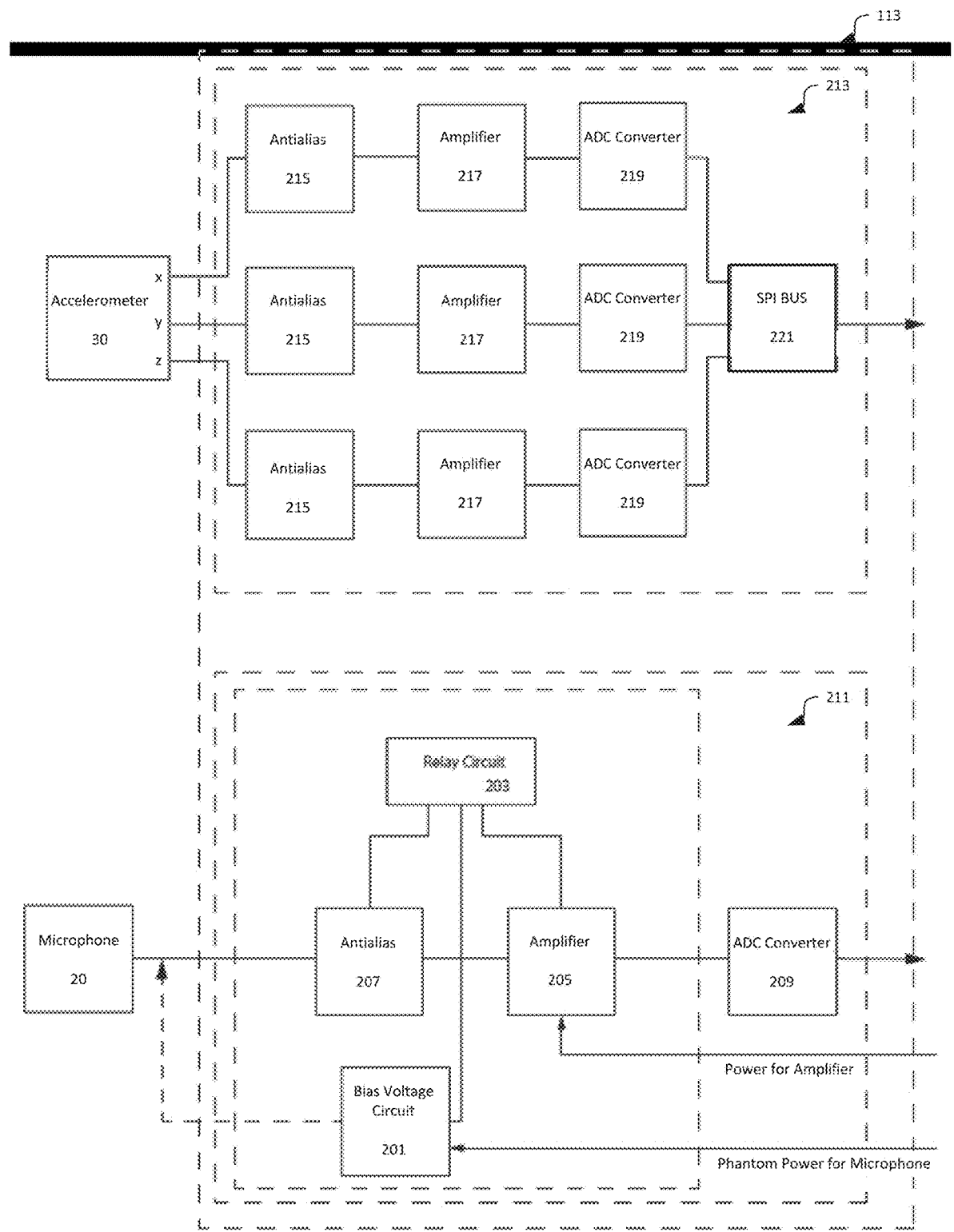
FIG. 3 shows a schematic view of the physical components of an analyser board of an embodiment of the device, with the connections between components shown.

FIG. 3 shows a schematic view of the components of the analyser board 113, with the connections between components shown. The analyser board 113 comprises of 2 subsections: a noise analyser 211 and a vibration analyser 213. The noise analyser 211 is used to take noise related measurements and perform initial processing on these measurements. The noise analyser 211 comprises a connection from a microphone 20 (via the socket board 119), a circuit 201 arranged to supply a bias voltage to the microphone (using a phantom power input when required), a relay circuit 203, an electrical amplifier 205, an electrical filter 207, preferably an anti-aliasing filter, and an analogue to digital convertor 209. In use, analogue electrical signals output by the microphone 20 pass through the relay circuit 203 which selects the most accurate signal path depending on the microphone used and signal strength. The signal may then be filtered and/or amplified before being converted to digital signals and sent to the processor 121.

Figure 4A:
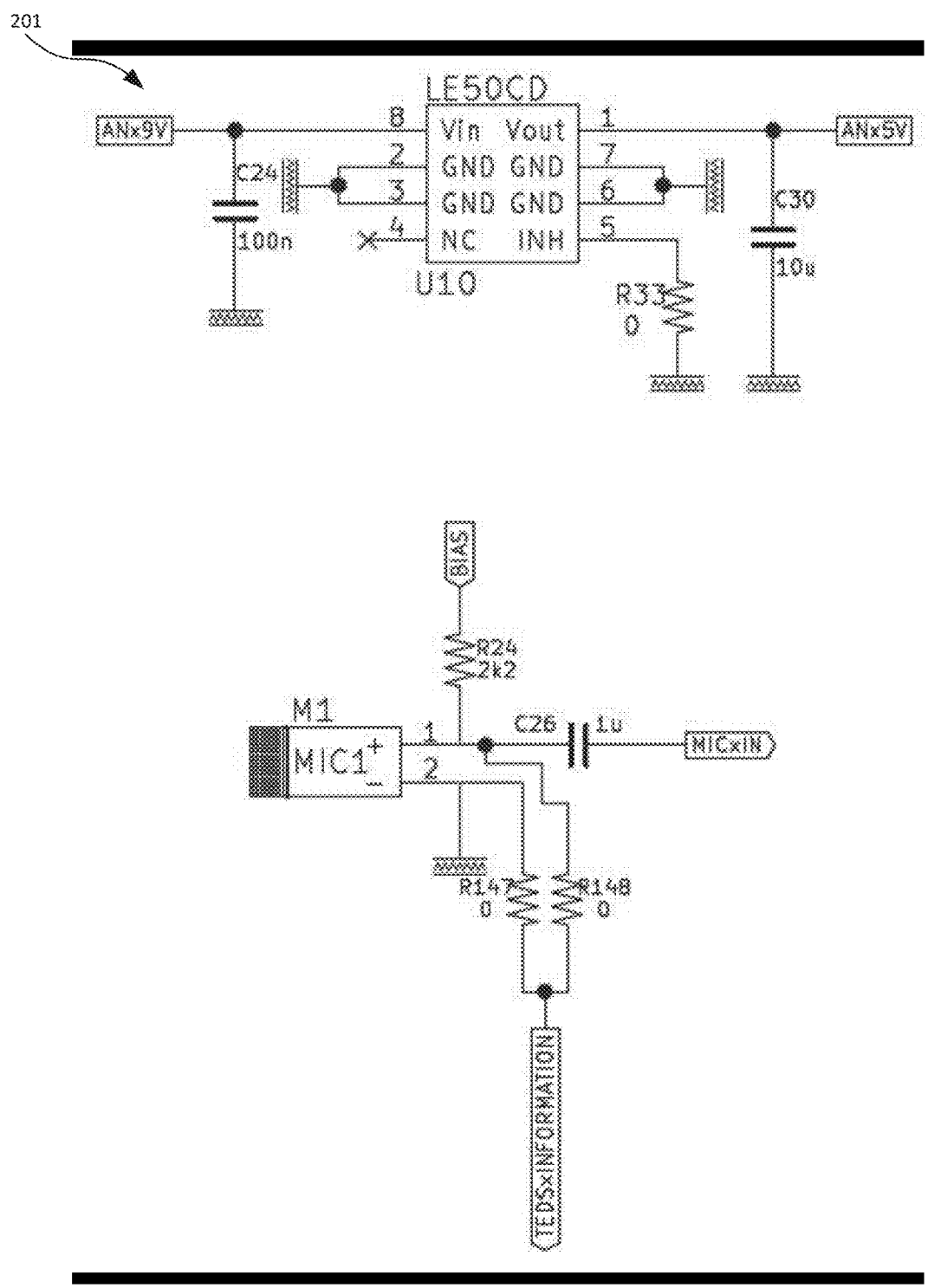
FIGS. 4a, 4b, 4c and 4d show circuit diagrams illustrating various possible configurations for electronic components of an audio analyser of an embodiment of the device.
Figure 4B:
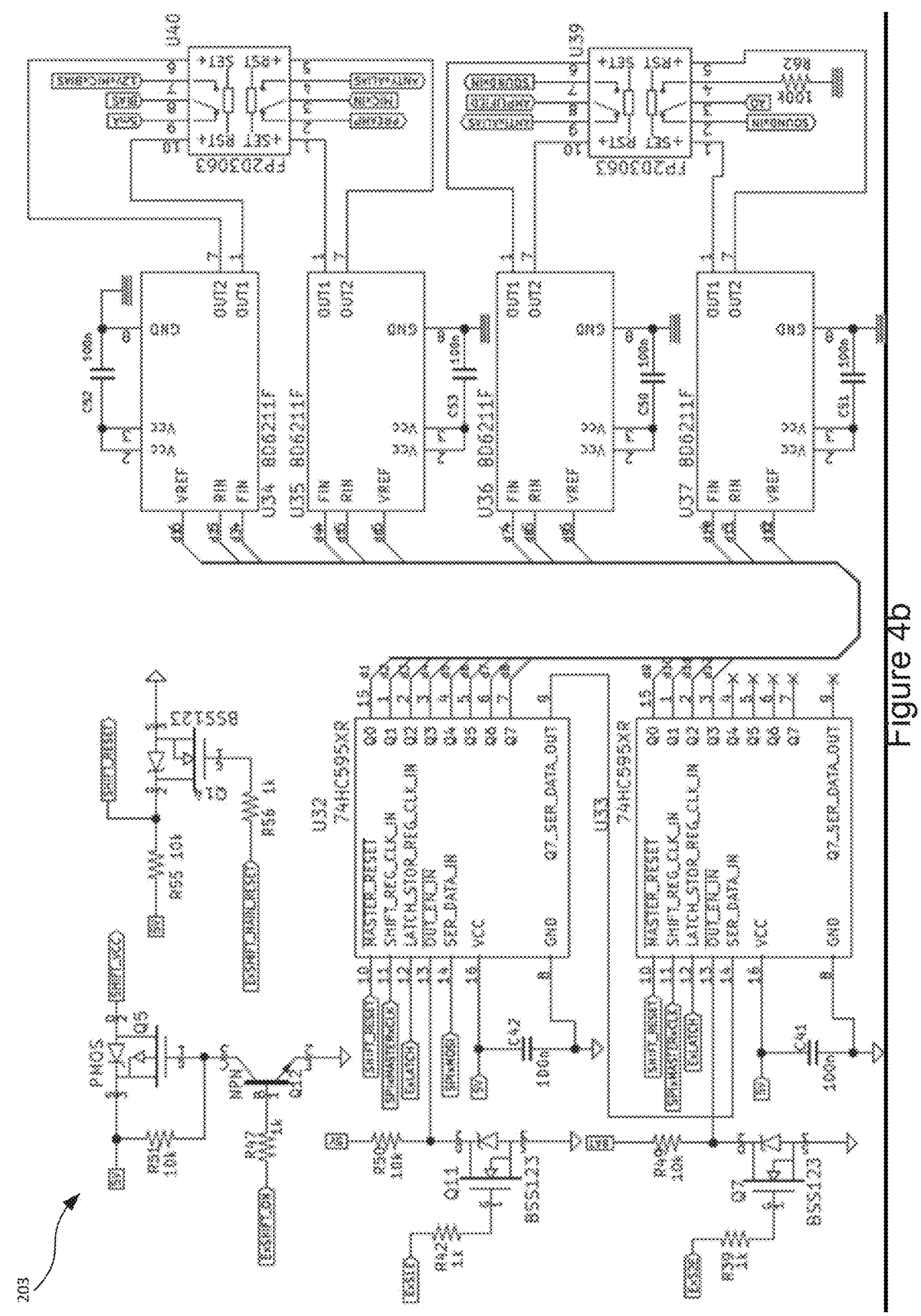
Figure 4C:
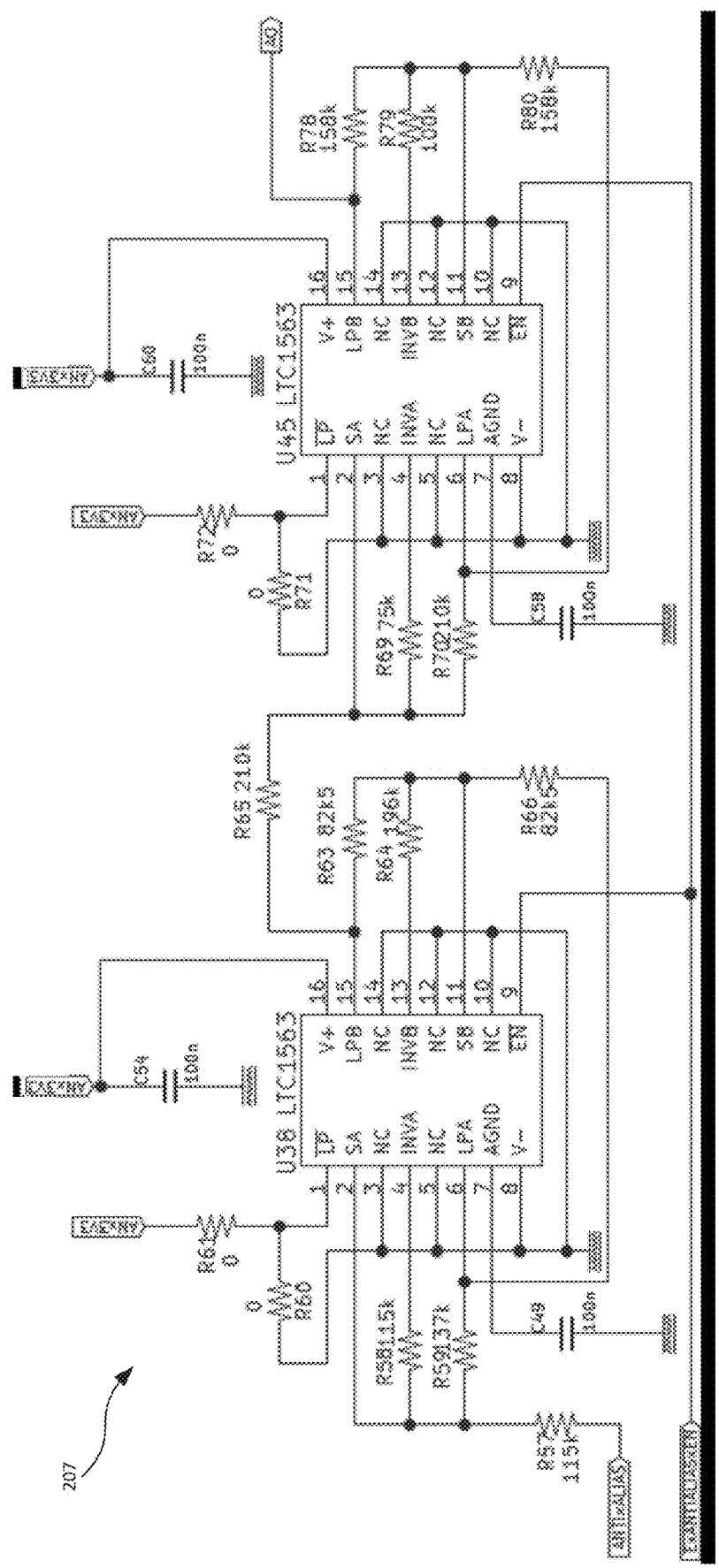
Figure 4D:
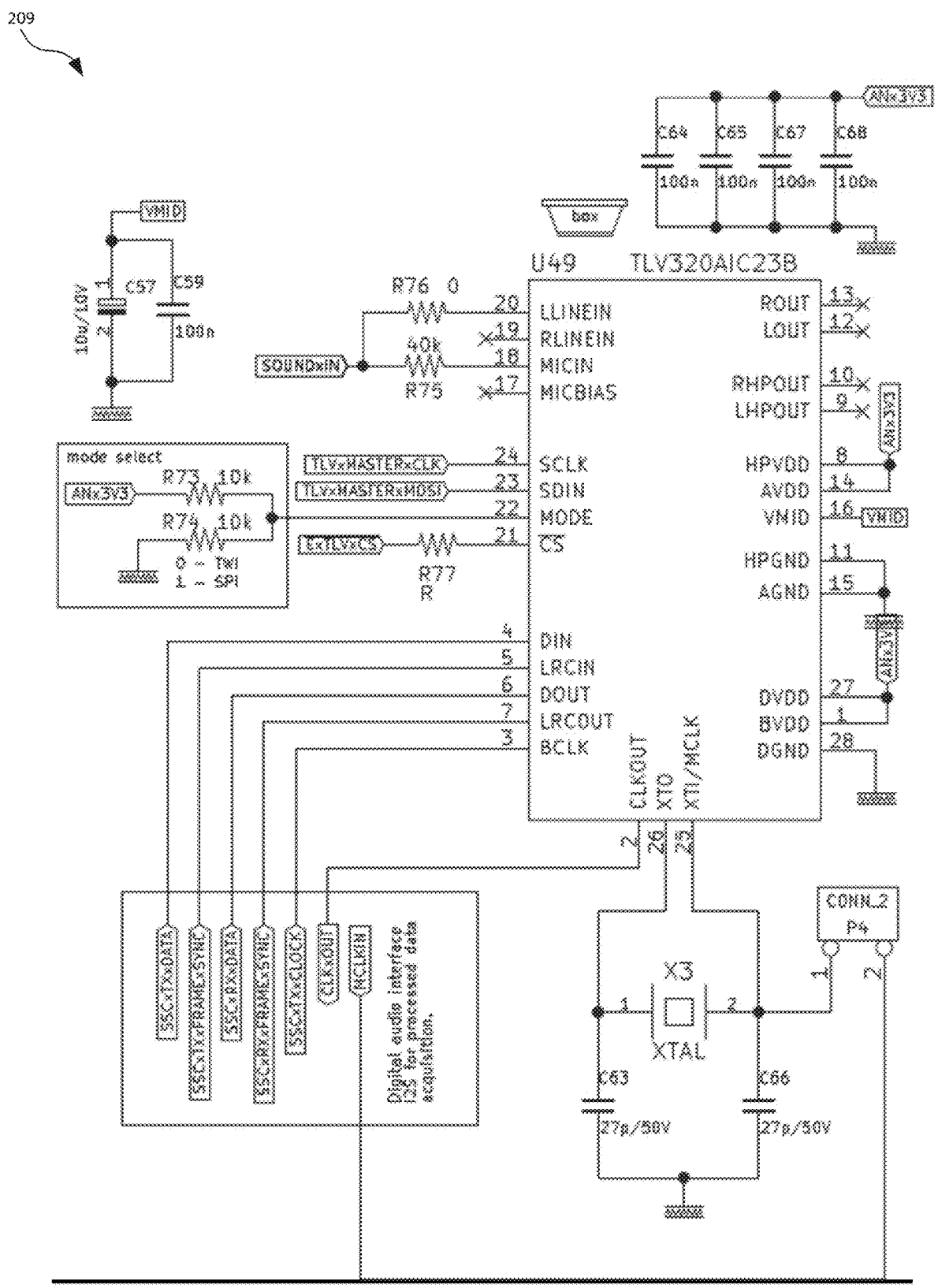

FIG. 4a shows a circuit diagram illustrating a possible configuration of the circuit 201 arranged to supply a bias voltage to the microphone 20, along with the connections to and from the microphone 20. Similarly, FIG. 4b shows a circuit diagram illustrating a possible configuration of the relay circuit 203. FIG. 4c shows a circuit diagram illustrating a possible configuration of the antialiasing filter 207, which is provided in this embodiment as an 8 order Butterworth antialiasing filter which is set for an input signal with a frequency of 20 kHz. FIG. 4d shows a circuit diagram illustrating a possible configuration of the analogue to digital convertor 209, which is arranged in this embodiment to provide a maximum of 24 bit output at 96 kSPS (samples per second).

Similarly to the noise analyser 211, the vibration analyser 213 is used to take vibration-related measurements and perform initial processing on these measurements. The vibration analyser 213 comprises a connection from an external accelerometer 30 (via the socket board 119), one or more antialiasing circuits 215, one or more electrical amplifiers 217, one or more analogue to digital convertor (ADCs) circuits 219 (which also acts as low-pass filters), and a connection to the processor 121 through SPI BUS 221. Several types of accelerometer 30 may be used, such as piezoresistive or piezoelectric sensors, strain sensors, or MEMS sensors. Whichever type of accelerometer 30 is used, the ADC circuit 219 is used to detect a change of a parameter, typically resistance, and cause an output of an electrical signal which is proportional to the measured acceleration. Preferably, acceleration is measured in three axes, necessitating the use of three antialiasing circuits 215, amplifiers 217 and ADC circuits 219. Typically, one tri-axial accelerometer 30 can be used to measure all three axes, as is shown in FIG. 3. The output of the antialiasing circuits 215 is amplified by the electrical amplifiers 217 and then converted into a single digital signal by the analogue to digital convertor(s) 219. The signal is then sent to processor through SPI BUS 221.

Figure 5A:
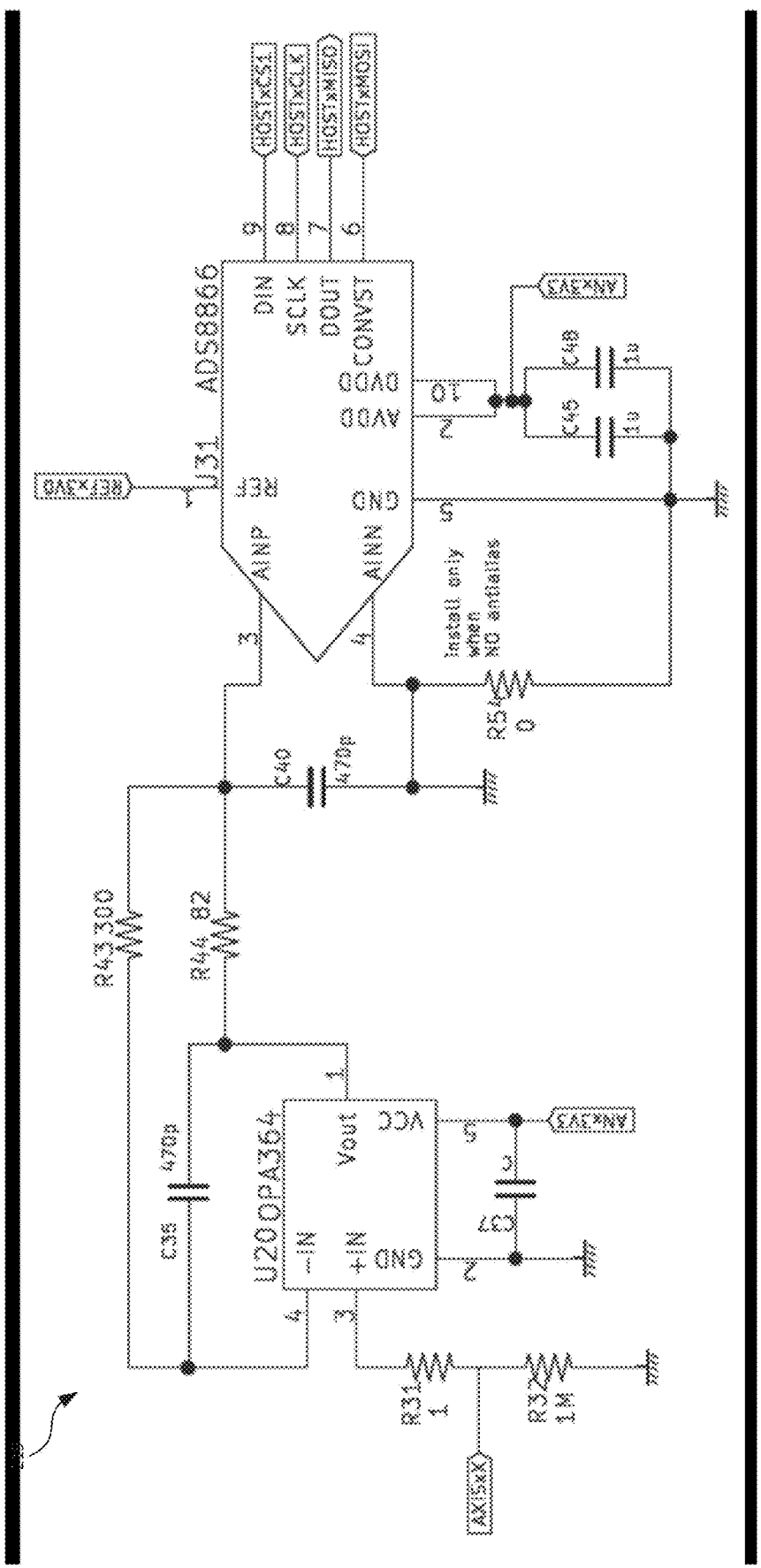
FIGS. 5a and 5b show circuit diagrams illustrating various possible configurations for electronic components of a vibration analyser of an embodiment of the device.
Figure 5B:
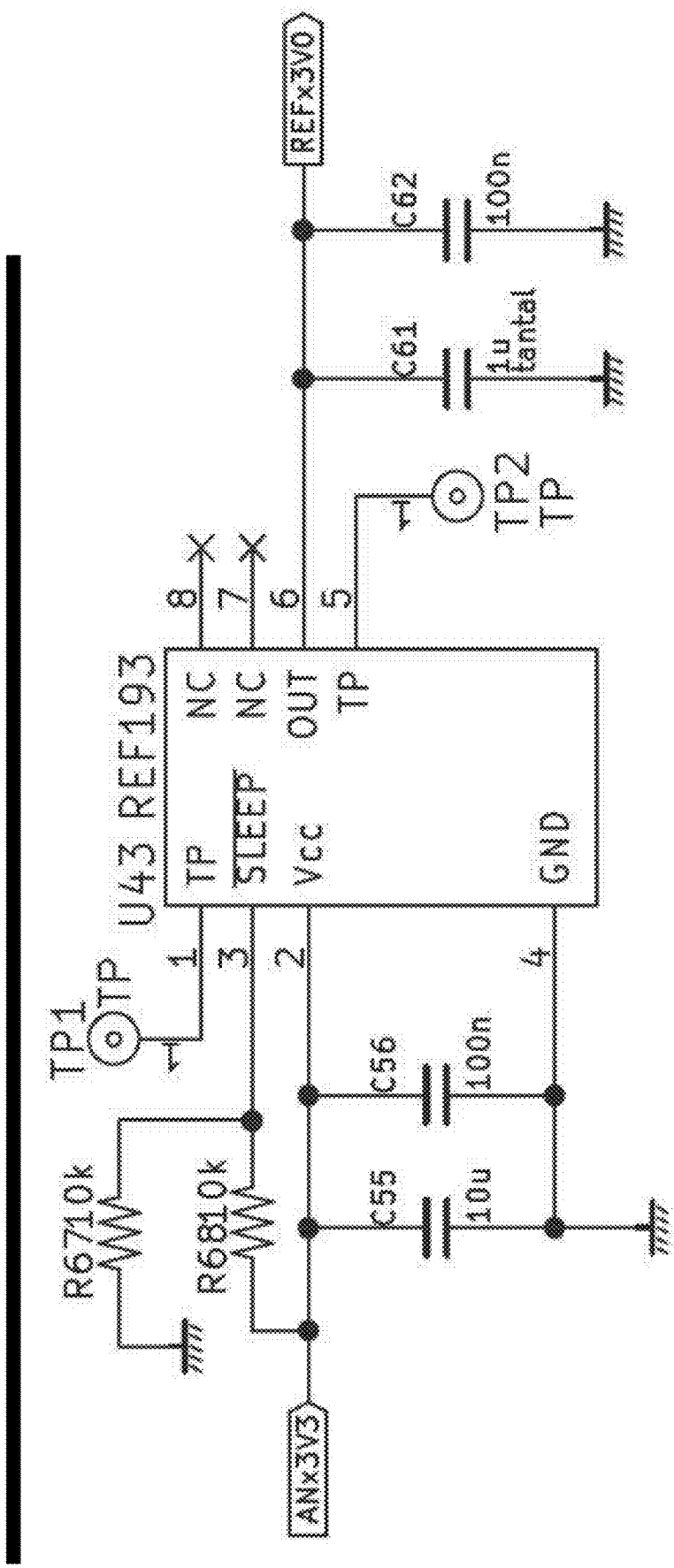

FIG. 5a shows a circuit diagram illustrating a possible configuration of the analogue to digital convertor 219 for one axis of the vibration-monitoring functions of the device. FIG. 5b shows a circuit which may be used to provide a reference input voltage into this analogue to digital convertor 219.

Figure 6:
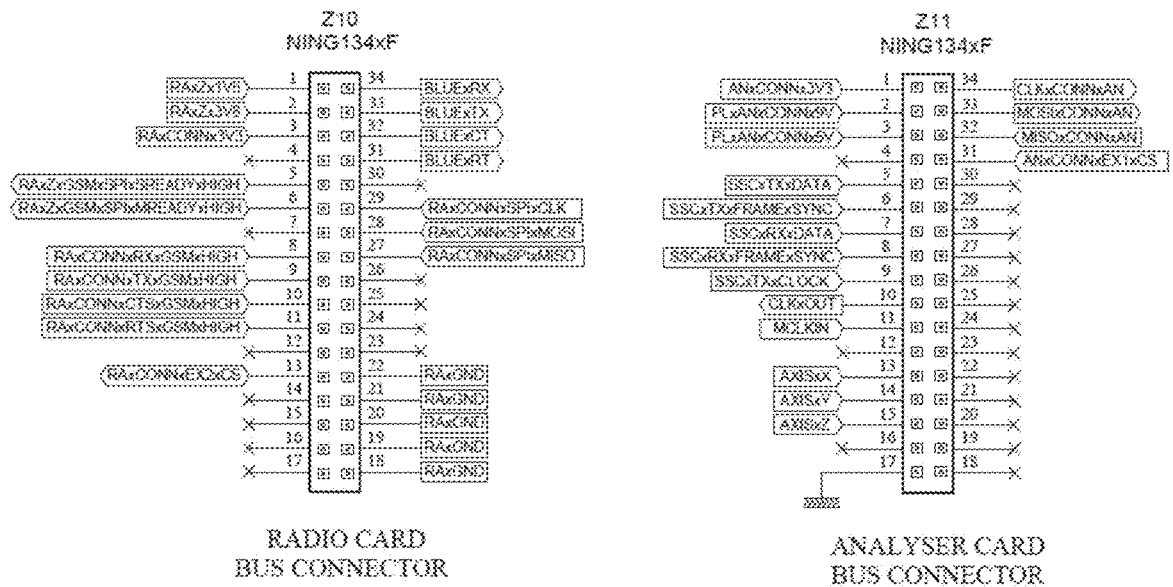
FIG. 6 shows electrical connections between various boards of an embodiment of the device.
Figure 6:
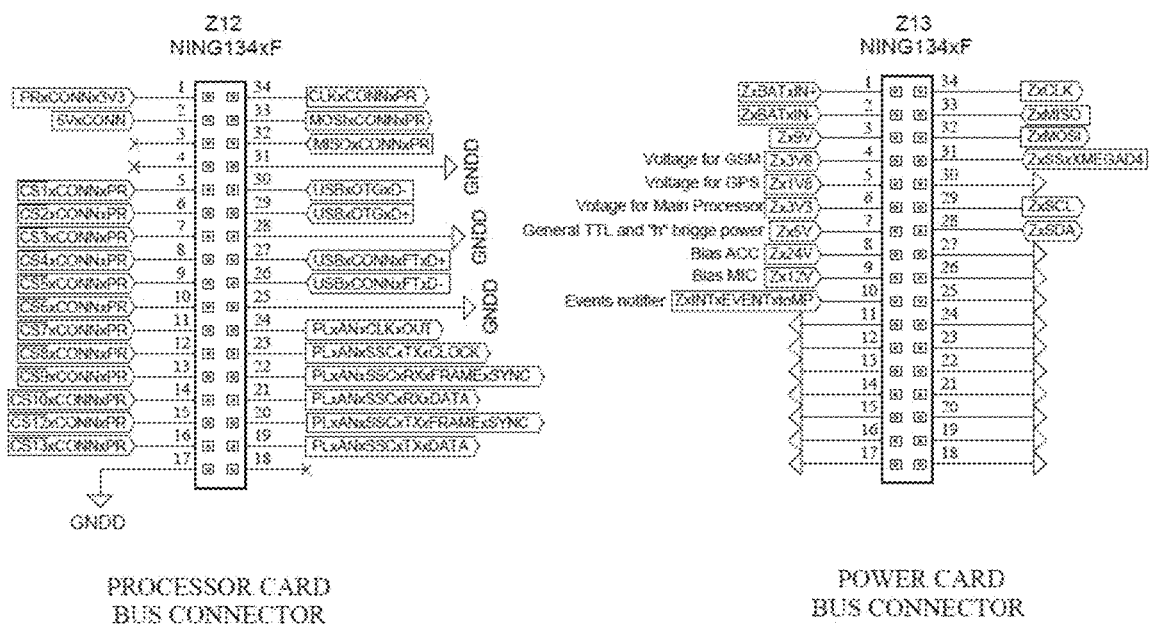

FIG. 6 shows a possible embodiment of the electrical connections between the various boards. It will, however, be appreciated that the boards may be connected in many different ways.

Optionally, a digital accelerometer may be used instead of the analogue accelerometer 30 described. Such an accelerometer 30 would require different signal processing functions, so as such it is envisaged that these functions are provided using components provided on a separate, removable board which may replace the conventional analyser board 113.

Further details on the parameters will now be described. The device 100 is arranged to measure a variety of user-selectable statistical parameters related to noise and vibration. The parameters may relate to displacement, octaves, or statistics. Preferably, the device calculates only those parameters selected by the user during configuration, as will be described later on. The device 100 may be arranged to perform spectral analysis on the input signal to calculate one or more parameters. A set of calculated parameters is preferably generated at the end of a user-set time period (referred to as the 'integration period'), rather than being continuously calculated.

For noise, the parameters may include sound pressure level, highest value measured over a time period ($L_{max}$), lowest value measured over a time period ($L_{min}$), equivalent continuous noise level ($L_{eq}$), sound exposure level (SEL), peak sound measurement ($L_{peak}$), day-evening-night equivalent sound level ($L_{den}$), and statistical noise levels ($L_n$), which refers to the noise level exceeded for n % of the time. Frequency values recorded may be grouped as single octave bands or as one third octave bands, depending on the level of detail required. 'A', 'C' or 'Z' frequency weightings may be used in the electronic filters provided in the device. 'A' weighting is most useful to model the response of the human ear to noise, 'C' weighting is most useful for the measurement of peak sound pressure level, and 'Z' weighting provides a 'flat' weighting for some other applications. A fast, slow, or impulse time constant may be selected by the user. The integration time period may also be specified, as described later.

The total dynamic range (i.e. the ratio of the largest measurable signal to the smallest measurable signal) of the noise-monitoring function of the device 100 is preferably 16 dB(A) RMS-140 dB(A) Peak. Within this dynamic range, the detected signal from the microphone 20 is preferably linear within at least the range 26 dB(A) RMS-140 dB(A) Peak. The device input frequency range for noise is preferably 20 Hz-20 kHz (although this will depend to some extent on the microphone 20 used). The device's electroacoustic performance, in combination with the microphone 20 used, is in some embodiments such that it conforms to the specifications of IEC 61672-1 for a class 1 sound level meter.

Similarly, a variety of vibration-related parameters may be measured and/or calculated. These parameters may include RMS, MAX, and PEAK vibration measured over a time period, which are useful parameters for measuring machine vibration; peak particle velocity (PPV) which is a measure of ground vibration; and vibration dose value (VDV), which is a cumulative measurement of the vibration level received over a long time period. The dominant discrete frequency of the highest PPV recorded within the integration period may also be calculated. These parameters may be calculated both as total values and in each of the three axes individually. As with noise measurements, frequency values recorded may be grouped as single octave bands or as one third octave bands, depending on the level of detail required.

The dynamic range of the vibration-monitoring function of the device 100 is in some embodiments around 0.0005 $m/s^2$ RMS to 50 $m/s^2$ PEAK, although this will depend on the accelerometer 30 used. The device input frequency range for vibration is preferably from 1 Hz-10 kHz. The device's vibration monitoring performance, in combination with the accelerometer 30 used, is preferably such that it conforms to ISO 10816-1 when used to monitor machine vibration.

Figure 7:
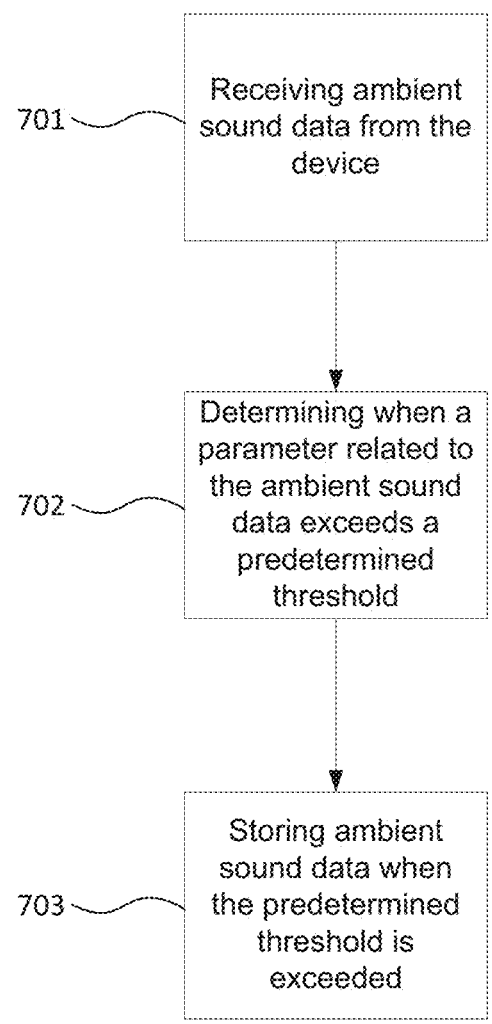
FIG. 7 shows a flow diagram illustrating an example of the audio recording functionality of the device.

FIG. 7 shows a flow diagram illustrating an example of the audio recording functionality of the device 100. The device 100 preferably has the function to record audio data to allow a user to recognise a source of noise during playback at a later time. This audio recording function may be implemented using the processor board 111 and/or the analyser board 113 as described, where the processor board 111 and/or the analyser board 113 may be modified to incorporate means for audio recording.

As shown in the Figure, the ambient sound data may be received (step 701) using microphone 20, for example. In step 702, a parameter (such as one of the parameters described above) related to the ambient sound is determined to have exceeded a predetermined threshold. Ambient sound data may then be stored, as shown in step 703.

The audio data is not saved continuously, as very high volumes of data would then need to be saved and/or transmitted. Additionally, saving continuous audio may allow users of the device 100 to be capable of intrusively listening in on audio of the device's surroundings, such as conversations between passers-by, which may lead to public disquiet and may breach local privacy laws. To mitigate such problems, the device 100 only records specific audio samples during periods where predetermined noise limits are exceeded, and for only long enough to allow the source of noise to be identified during later playback.

Figure 8:
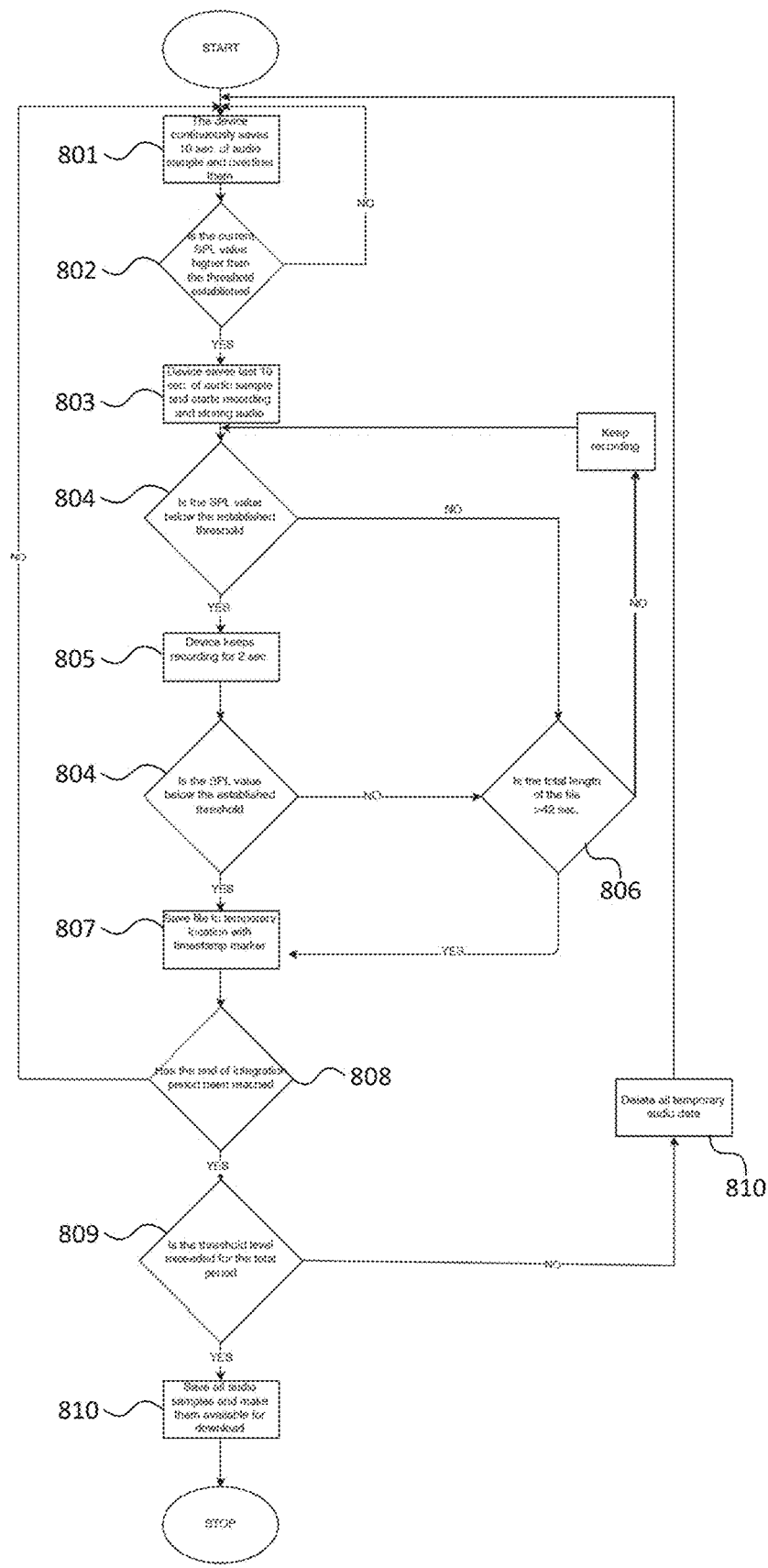
FIG. 8 shows a flow diagram illustrating a further example of the audio recording functionality of the device.

FIG. 8 shows a flow diagram illustrating a further example of the audio recording functionality of the device 100. In step 801, short samples of audio may be continuously recorded into a buffer in local memory, such as in memory card 131 and/or NAND FLASH memory 125. The contents of the buffer may be continuously overwritten by new audio samples. The samples may be, for example, 10 seconds long. The contents of the buffer are not available for the user to access. In step 802, if measured noise exceeds a predetermined threshold sound pressure level (or equivalent parameter determined as described above), the contents of the buffer may be saved into local memory (step 803), for example by being saved to a different location on memory card 131 and/or NAND FLASH memory 125. In an example, the processor 121 may be used to determine whether the threshold is exceeded. The threshold may be, for example, 70 dB(a)$L_{eq}$. Additionally, live audio may be recorded and saved into local memory (step 803), as described with reference to FIG. 7. The contents of the buffer and the recorded live audio may be assembled into a single audio file by the processor 121 prior to being saved to local memory, such that there are no gaps in audio playback. The use of a buffer allows for the source of noise to be recorded before the noise level goes above the threshold, which may make it easier for the user to identify the source of noise.

The device is arranged to continue recording while comparing the measured sound pressure level against the threshold (step 804). If the sound pressure level drops below the threshold for a predetermined short period of time (step 805), such as 2s, the device 100 will stop recording and the recording may be saved to a temporary location (step 807). If the sound pressure level exceeds the threshold within the predetermined time period following it dropping below the threshold, recording will continue. In addition, if it is determined that the noise level has remained above the threshold for more than a predetermined period (step 806), which may be 30 s, for example, the device 100 will stop recording and the recording may be saved to a temporary location (step 807). The size of the audio file is thereby minimised. With the example given, the maximum length of an audio recording may therefore be 42 s. In alternative, the total file length may be compared against a predetermined maximum (for example, 42 s) to determine whether recording should be stopped due to the file being too long. If the threshold is exceeded within the length of a sample after recording has stopped (i.e. within 10 s of recording being stopped), the shortened audio sample present in the buffer will be saved into local memory and recording of live audio will begin as normal.

This recording process is carried out throughout an integration period. At the end of an integration period, an overall sound pressure level or equivalent measurement for the period may be determined. If this overall sound pressure level for the period exceeds the threshold (step 809), the recorded audio file(s) are made available to the user (step 810), for example, by being exported to an external server 150. If the overall threshold is not exceeded, the recorded audio file(s) are not made available to the user, and may be deleted (step 810). This means that only significant sources of noise are reported to the user. The recorded audio file(s) may then be deleted from local storage following transmission to the external server 150.

Optionally, the recorded audio file(s) are only exported to the external server 150 upon request from a user, in order to reduce the costs and/or increase the efficiency of data transmission. The recorded audio files may be sent in an uncompressed format, such as .wav, or a compressed format, such as .mp3. Recorded audio files may be timestamped to assist in the identification of sources of noise. If the maximum local storage of the device 100 is exceeded, older recorded audio files may be overwritten with newer files.

Further details about the processing will now be described. The device 100 performs all processing on collected raw data on the device 100, providing the advantage of easy access to relevant calculated parameters that may readily be analysed. The device 100 may be able to collect data and act on it in near-real time. The integration period may range from a minimum of 1 second to a maximum of 24 hours, for example, depending on the level of detail required. Raw data collected within the integration period is analysed in portions and the desired parameters are calculated at the end of each integration period. For many parameters, data must be integrated over the integration period in order to accumulate data readings into a single value. Different integration periods and parameters are suitable for different situations, and so the high programmability and customisability of the device 100 allows it to be used in a wider range of situations than current equipment.

The set of calculated parameters, referred to as results, are then assembled into a single file with associated time (from the real time clock 129) and/or location (from the GPS chip 307) data. Optionally, the results file may also comprise an identifier of the device, such as a unique number, as well as any audio files recorded during the integration period. The results file may also comprise data and/or metadata to assist in the later processing of the results file, such as data relating to the project with which the device is presently associated. The result file is then transmitted to an external reporting server 150. The functionality of the server 150 will be detailed later on. In case of connectivity issues all results will be stored on the device 100, and when communication is regained all unsent results may be transmitted to the server 150. All results from one day (or over any other period longer than the user-defined time period described above) may be combined into a single file, if desired. The results file is preferably in the form of a Message-Queueing Telemetry Transport (MQTT) data packet. All other transmissions to and from the device 100 are similarly preferably also in the form of MQTT data packets. MQTT is preferred as the protocol for use with the device 100 because it is extremely lightweight, making it suitable for use for applications which must transmit data from remote locations where memory usage should be minimised, such as the device 100.

Optionally, the device 100 may be configured to calculate a number of parameters per time interval, where time intervals are short periods of time such as 10s, alongside calculating parameters at the end of every integration period as described above. These parameters are assembled into a results file and transmitted as described above, providing near-real time measurements of noise and vibration. The 'near-real time' parameters may differ from with those calculated at the end of an integration period, or alternatively may overlap. The 'near-real time' parameters may include current SPL and $L_{EQ}$ since the start of the integration period for noise, along with RMS vibration over the period and current PPV for vibration.

The device's configurations settings are configured externally and sent to the device 100, as the device itself has no buttons or screen. The device 100 gathers and processes data based on the configuration settings. The configuration settings can be sent to the device 100 through a network via an external server 150, uploaded via the USB connection (if present) or through Bluetooth connection via a mobile application installed on a user device, as will be described later on. Where the device is configured via the USB connection or Bluetooth connection, the configuration settings are synchronised with the server 150. The configuration settings may comprise the desired parameters to be saved (if not all measured parameters are desired), the user-defined time period, modes of operation, such as the times of day when the device should be active (if continuous measurement is not desired), contact details and any alert thresholds, as will be described later on. The configuration settings may be assembled into a file, which may be referred to as a 'configuration file', which may be downloaded by the device from the external server 150 and may be stored in the memory card 131 and/or NAND FLASH memory 125, for example. The external server may optionally be configured to push the configuration file to the device 100 each time a new connection is established between a device 100 and the external server 150. The configuration file or specific data related to the configuration settings may be imaged to each of the processor board 111, analyser board 113, power board 117, radio board 115 and socket board 119. The configuration data may comprise a firmware or software update, which may be pushed out to the device 100 from the external server 150. Where firmware and/or software is updated, the device 100 may be configured to download the update, check the new firmware and/or software for errors, and, if there are no errors, restart itself in order to implement the update.

Figure 9:
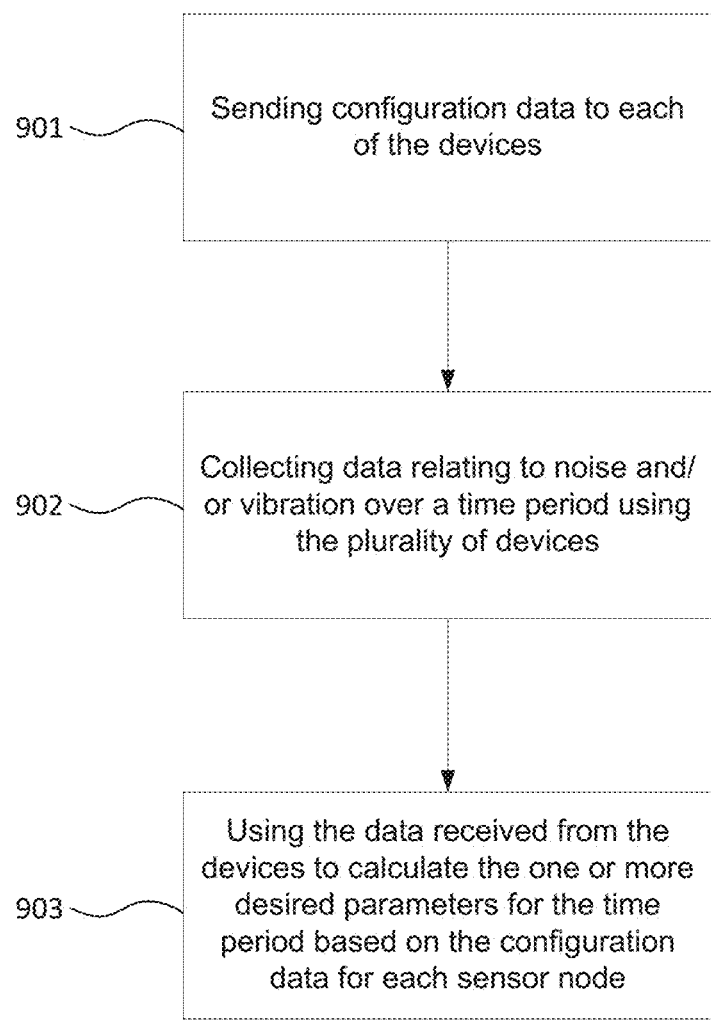
FIG. 9 shows a flow diagram illustrating how a plurality of devices may be operated based on configuration data from an external server.

FIG. 9 shows a flow diagram illustrating how a plurality of devices 100 may be operated based on configuration data from an external server 150. In step 901, configuration data may be sent from the external server 150 to the device 100. In step 902, the devices may monitor noise and/or vibration as described. In step 903, parameters may be calculated as described, where those parameters are specified by the configuration data. The device 100 therefore calculates only those parameters selected by the user during configuration.

Figure 10:
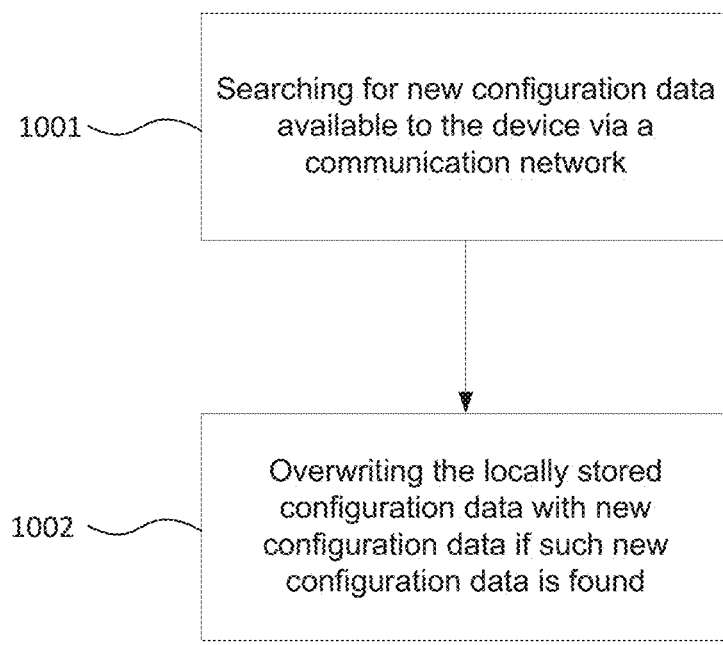
FIG. 10 shows a flow diagram illustrating how the device downloads configuration data.

FIG. 10 shows a flow diagram illustrating how the device 100 downloads configuration data. In step 1001, the device 100 searches for new configuration data available via a communication network (using the radio board 115). Typically, the device 100 will attempt to connect to the external server 150. In step 1002, existing configuration data present on the device 100 is overwritten by new configuration data. The device 100 may then continue to monitor noise and/or vibration on the basis of the new configuration data. The device 100 may be configured to check for (and download, if possible) new configuration data after a given interval, such as every 30 minutes. This process will also take place when the device is started up, including when the device is started up following a firmware update and/or software update, and when the device is started up following a power failure. The device may also follow the same process when the connection to the external server 150 is re-established after being lost.

The device may be configured so as to minimise disruption in the event of the device losing power. Where the device has switched off due to no external power source being connected and where the internal battery is depleted, the device may be arranged to automatically start up upon the connection of the external power source. When the device starts up, the device may attempt to establish a connection with the external server 150, search for and download a new configuration file as described, and then begin measurement of noise and/or vibration according to the configuration file already present on the device or that has just been retrieved from the server.

The device requires calibration in order to accurately gather data. Calibration may be initiated remotely from the external server 150 or via USB or Bluetooth connection from a user device. Optionally, configuration files may comprise calibration data, such as calibration factors, or may cause calibration to be initiated. Calculated calibration factors may be saved for subsequent reference during processing.

For noise measurement, calibration is performed by initiating calibration, applying a reference signal produced by an external calibrator, and by measuring the applied signal for a fixed time period (for example, 5 seconds) and calculating a final sound pressure level value. A calibration factor may then be determined based on the calculated value and the real sound pressure level of the reference signal (which may be selected by the user at a user device, for example). A user may then accept the calibration factor, whereupon the calibration factor is saved and synchronised between the external server 150 and the device 100.

For vibration measurement, manual calibration may be required. To do this, sensitivity values provided by the manufacturer of the accelerometer may be entered into the device using the external server 150 or a user device connected through a USB connection or Bluetooth. Similarly, a calibration factor may be saved and synchronised between the external server 150 and the device 100.

Alternatively, if the microphone and/or accelerometer used is TEDS compliant, calibration values may be read from the microphone and/or accelerometer, saved to the device 100, and synchronised between the device 100 and an external server 150. In a further alternative, calculated calibration factors may be saved directly to TEDS compliant microphones and/or accelerometers.

The device 100 may, optionally, be arranged to generate alerts when a user-defined threshold for one or more noise or vibration parameters are exceeded. This functionality makes the device 100 suitable for use as an emergency warning system while acting as a passive monitor. Optionally, the threshold used for audio may be the same threshold used to initiate audio recording. Alerts may also be generated in dependence on the condition of the device 100 (for example, when the battery 103 is on low voltage, when the external power is connected or disconnected, when a measurement error is detected, when a sensor is connected or disconnected, which may be detected by measuring the current through the sensor, or when the device 100 is moved, tilted, or dropped, as detected by the internal accelerometer 409 or changes in the location data sent in messages to the server 150), and may be set to different thresholds and/or parameters depending on the time of day or day of the week, for example. The alerts are preferably transmitted to an external server 150 over a data connection, which may transmit the alerts as text messages, notifications within a mobile application or web portal, or e-mails. Alternatively, alerts may be directly transmitted by text message, using the device's GSM cellular networking capability, or by e-mail, using a GSM network or WLAN, for example. In a further alternative, in case of lack of data connectivity, the device may send a text message related to the alerts to an external server 150, which may then transmit the alerts as described. A list of relevant contact details may be user-defined. The device 100 may use different contact details depending on the type and urgency of the alert; for example, different contact details could be set for 'users' and 'administrators,' where both users and administrators receive alerts about thresholds being exceeded but only administrators receive information about the condition of the device 100. Optionally, an externally provided signalisator (not shown) may be connected via the signal output connector 401 to provide further alert functionality by means of a flashing LED or a tone, for example.

The device may be arranged to shut down sequentially as the batteries are depleted to extend the battery life and to allow the device to record measurements for longer. For example, components unrelated to measurement or calculation of parameters (such as the radio board 115) may be shut down to allow the device to record measurements for longer.

Figure 11:
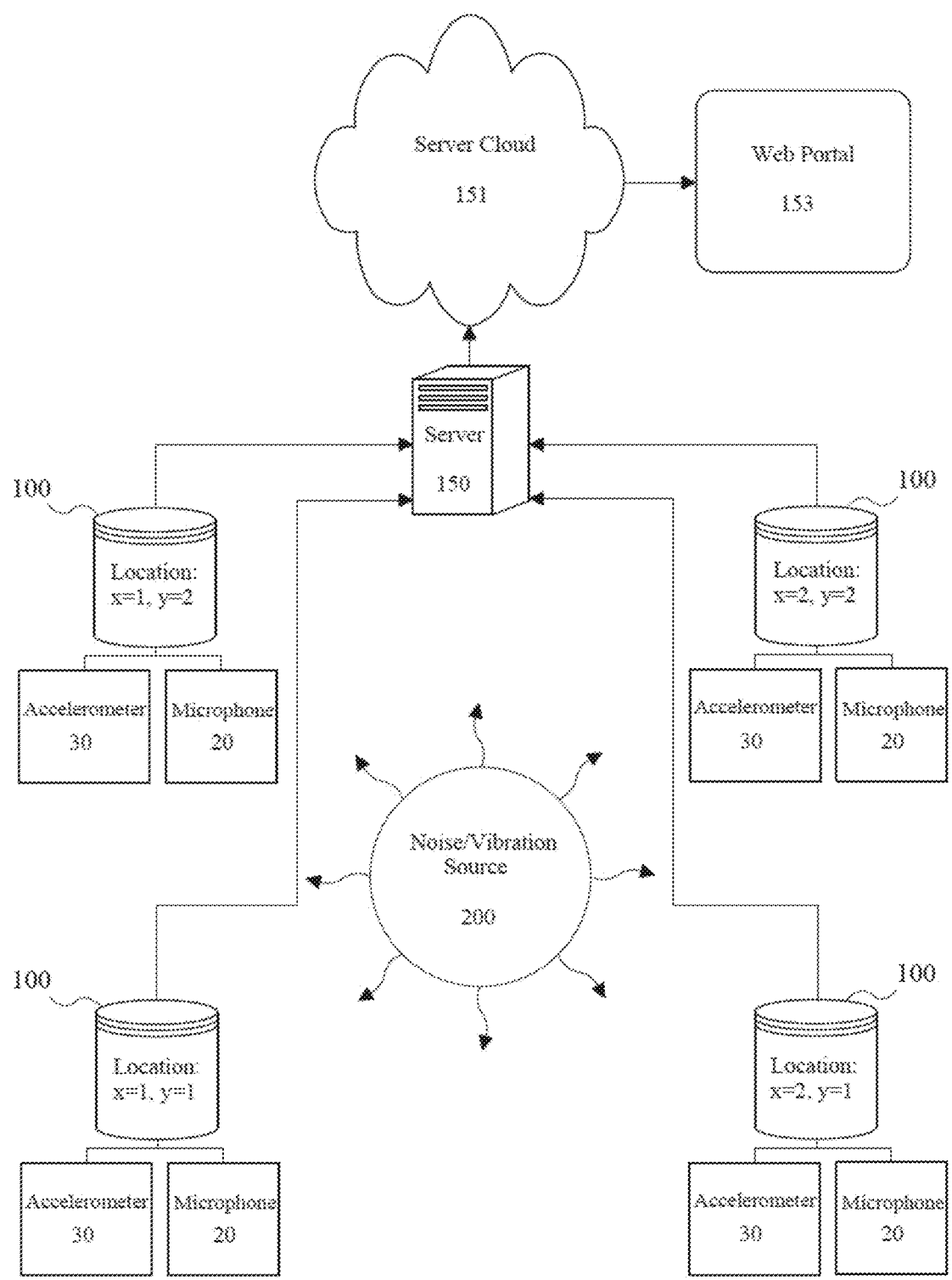
FIG. 11 shows a schematic view of a network of devices monitoring a noise/vibration source, indicating how data is transmitted.

Further details about the networking will now be described in relation to FIG. 11, which shows a schematic view of a network of devices 100 monitoring a noise/vibration source 200, indicating how data is transmitted in a network. As described above, an external server 150 may receive transmissions from the device 100, where the transmissions comprise results files. The server 150 may compile a database of results, which may then be accessed by users. Users may access results by logging on to a web portal 153 or by using a mobile application, for example. The results transmission may be either 'pushed' to the server 150 or 'pulled' from the device by the server 150, depending on the connection quality and the required time between refreshes of the data. The communication between the device 100 and the server 150 may take place using a variety of media, depending on availability. In the ideal case, a WLAN connection is used, but if this is not available a wired local area network connection could be used, or a GSM network. Where no such communication with the server 150 is possible, for example, in remote areas where wired connections are impractical for reasons of range, data saved on the device's memory card 123 may be uploaded to the server 150 at a later date, or downloaded via Bluetooth connection.

The server 150 may comprise a cluster of servers and services known as a cloud server 151, as shown in FIG. 4. The purpose of the server 150 and/or server cloud 151 is to process the data from the one or more devices 100 (at a 'back end') and display the processed data to the user (at a 'front end'), thereby compiling the results files from one or more devices 100 into useful reporting data for the user. It should be noted that the compilation of data from the devices 100 and the processing of said data to produce useful results may be provided separately, such as on separate servers.

It is envisaged that many devices 100 according to aspects or embodiments described herein form a network with such a server 150 to gather data from a variety of different locations, as shown in FIG. 4, which can then be compiled and presented to the user by the server 150, enabling a large area to be effectively monitored. The envisaged low cost of the device 100, geolocation functionality (via GPS) and the results file assembly (incorporating a variety of user-set parameters relating to noise and vibration) make the device 100 well suited for use in such a system, allowing an integrated, 'big data' approach which is impractical and costly to achieve with current noise and vibration monitoring equipment. In such a system, the device 100 acts as a data logger and data processor which gathers and processes all data, generates alerts and records audio data when required, and sends data to the server 150. The server 150 acts to combine and present data to the user and allows the device 100 to be configured and calibrated.

The web portal 153 serves as the 'front end' for the server 150, and may allow users to register, maintain and edit an account which the user may use to log in to the web portal 153. A user may be able to view the accounts of other users and set privileges for those accounts, which is useful for large projects where many users with different responsibilities are involved. The user may also create and modify projects, and assign or unassign devices to these projects.

As mentioned above, the web portal 153 preferably allows the user to configure all devices in a network that are registered to the user's account, as long as their account privileges allow it. This configuration data may then be assembled into a configuration file and remotely uploaded to the device via any of the communication means between the server 150 and the device 100 mentioned above. The new configuration file can also be uploaded to the device directly from a computer or a mobile device via Bluetooth connection. In this case, the device 100 will upload said new configuration file to the server 150, in order to synchronise the configuration data. The user may also configure the operating times of the device and alerts, included the recipients of said alerts, as described above. This data may be incorporated into the configuration file.

The web portal 153 is also used to report data from the server 150 to the user via a protocol. This reporting functionality preferably incorporates graphical presentations, including those that integrate the GPS readings from each device in a network with available mapping data, for example, such that each device is shown as a marker on the map. The user may be able to view selected parameters and look at gathered data over a specific time range, and compare it with historic data. The data may be provided in both graphical format (i.e. showing the time-history of noise and/or vibration) and tabulated format. All data may be downloadable and may be exported in a number of formats, such as .csv, .xls, and .pdf. It will be appreciated that the data collected by a network of devices may be presented to the user in a wide variety of useful ways.

Figure 12:
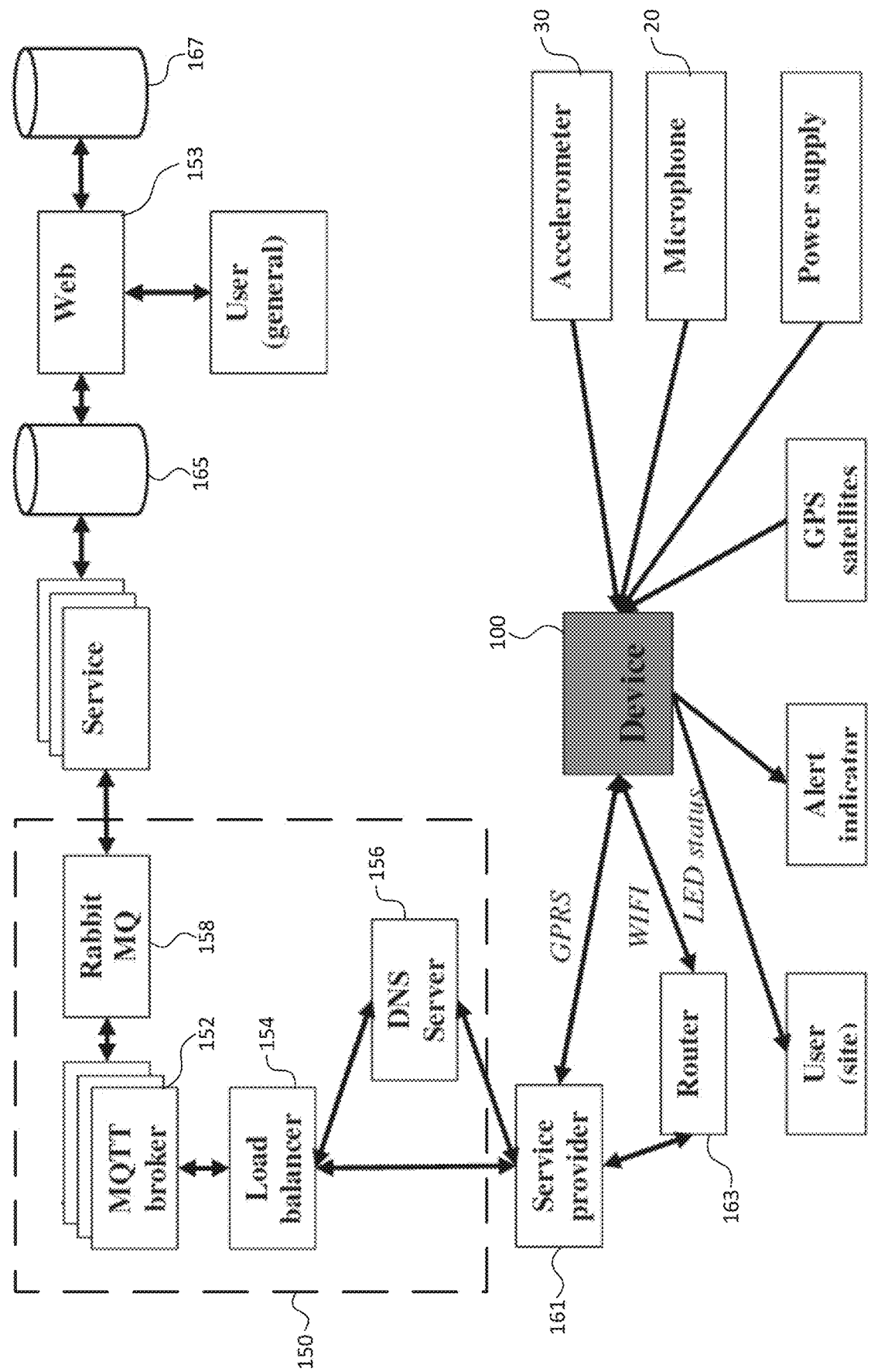
FIG. 12 shows a system architecture diagram of an exemplary network containing a device.

It will be further appreciated that the web portal 153 may also be provided as a mobile application or an installed program for a computer, for example. The mobile application may also allow a user device to configure and calibrate the device 100, read parameters calculated by the device, and download recorded audio files and/or results files via a USB or Bluetooth connection FIG. 12 shows a system architecture diagram of an exemplary network containing a device 100, illustrating how an exemplary network might transmit data from the device 100 to the user. The network preferably uses the MQTT protocol, where all outputs from the device 100 (such as the results files) are in the form of MQTT data packets and the server 150 comprises a MQTT broker. Data is received at the device via microphone 20 and accelerometer 30. The device 100 may also receive data from an external power supply and GPS satellites.

Alerts and/or a status of the device may be indicated to the user on site via an LED and/or a signalisator, as described. The results files are transmitted to a service provider 161 as MQTT data packets via either GPRS or WiFi. Where WiFi is used, the data packets are transmitted via a router 163. The data packets are then transmitted to a MQTT broker 152 via a load balancer 154 and a Domain Name System (DNS) server 156. The MQTT broker 152 may comprise a parser. The MQTT broker 152 may then interface with message broker software 158 (such as Rabbit MQ) to serve the data to the web portal 153, where it may accessed by the user. The 'raw' data from the devices may optionally be saved into data store 165, and the web portal 153 may query data store 165 and access processing resources (not shown) to present useful processed results to the user. These processed results may be saved into further data store 167. The DNS server 156, load balancer 154, MQTT broker 152, and message broker software 158 are shown as part of the external server 150, but it will be appreciated that this is merely a schematic representation and different components may be provided on different servers. Similarly, components that are not shown as part of the external server 150 may be provided as part of the external server 150.

In an alternative embodiment, the device 100 may have a reduced number of user-selectable parameters. For example, the device may not perform spectral analysis on input signals, and may instead calculate only overall noise and/or vibration levels.

It will be understood that aspects and embodiments have been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

What is claimed is:

1. A method for storing ambient sound recorded in an area using a microphone of a device, comprising:
   recording a signal of ambient sound using the microphone of the device;
   using a processor for executing a code for:
      applying a signal analysis on the signal for determining an ambient sound parameter;
      when the ambient sound parameter exceeds a predetermined threshold storing a recording of the ambient sound in a memory location;
      monitoring a length of time during which the ambient sound parameter exceeds the predetermined threshold; and
      only upon determining that when the ambient sound parameter has exceeded the predetermined threshold for longer than a duration of a predetermined time period, making the recording available to a user.

2. The method according to claim 1, wherein the ambient sound parameter is a measure of ambient noise.

3. The method according to claim 1, wherein the ambient sound is continually recorded and stored until the ambient sound parameter falls below the predetermined threshold.

4. The method according to claim 1, comprising the further steps of:
   recording a sample of the ambient sound into a local data buffer;
   overwriting contents of a local data buffer with the recorded sample; and
   storing the contents of the local data buffer when the predetermined threshold is exceeded.

5. The method according to claim 4, comprising the further step of:
   assembling the stored contents of the local data buffer and the recording of the ambient sound into a single audio file; wherein the audio file is continuous.

6. The method according to claim 4, wherein the length of the sample is between 1 and 30 seconds.

7. The method according to claim 1, wherein the processor is of the device.

8. The method according to claim 1; wherein the processor is of server external to the device.

9. The method according to claim 1, wherein the recording is stored on a memory of a server external to the device.

10. The method according to claim 1, wherein recording is stored on a data storage of the device;
    wherein the method further comprising:
       receiving a request to transmit one or more items of the stored recording, and
       transmitting the one or more items of stored recording to an external server in response to the request;
    wherein the device is in communication with the external server.

11. The method according to claim 1, wherein the making the contents of the local storage available to a user comprises transmitting one or more items of stored recording to an external server upon receipt of a request for said one or more items of stored recording from the external server, wherein the device is in communication with the external server.

12. The method according to claim 1, comprising the further step of:
    deleting the stored recording where the further predetermined threshold is not exceeded.

13. The method according to claim 1, wherein the stored recording of the ambient sound is time-stamped.

14. The method according to claim 1, comprising the further step of:
    transmitting an alert signal when the predetermined threshold is exceeded.

15. Apparatus for recording ambient sound, operable to carry out the method of claim 1.

* * * * *